US009329887B2

(12) United States Patent
Brandstätter et al.

(10) Patent No.: US 9,329,887 B2
(45) Date of Patent: May 3, 2016

(54) SYSTEM AND METHOD FOR CONTROLLING MULTIPLE COMPUTER PERIPHERAL DEVICES USING A GENERIC DRIVER

(75) Inventors: Klaus Brandstätter, Rosstal (DE); Stefan Heinrich, Erlangen (DE); Simon Vella, Mellieha (MT)

(73) Assignee: HOB GMBH & CO. KG, Cadolzburg (DE)

( * ) Notice: Subject to any disclaimer, the term of this patent is extended or adjusted under 35 U.S.C. 154(b) by 263 days.

(21) Appl. No.: 13/276,636

(22) Filed: Oct. 19, 2011

(65) Prior Publication Data
US 2013/0103380 A1 Apr. 25, 2013

(51) Int. Cl.
G06F 9/455 (2006.01)

(52) U.S. Cl.
CPC .. *G06F 9/45558* (2013.01); *G06F 2009/45579* (2013.01)

(58) Field of Classification Search
None
See application file for complete search history.

(56) References Cited

U.S. PATENT DOCUMENTS

| | | | | |
|---|---|---|---|---|
| 5,265,252 | A * | 11/1993 | Rawson et al. | 719/326 |
| 6,247,067 | B1 * | 6/2001 | Berliner et al. | 719/321 |
| 6,269,408 | B1 * | 7/2001 | Berliner | 719/324 |
| 6,393,495 | B1 | 5/2002 | Flory et al. | |
| 6,671,743 | B1 * | 12/2003 | Verity | 719/321 |
| 6,671,749 | B2 * | 12/2003 | Williams et al. | 710/10 |
| 7,181,610 | B2 * | 2/2007 | Zimmer et al. | 713/2 |
| 7,254,816 | B2 * | 8/2007 | Rosenbloom et al. | 719/327 |
| 7,437,613 | B2 | 10/2008 | Baumberger | |
| 7,558,723 | B2 | 7/2009 | Traut | |
| 7,562,368 | B2 * | 7/2009 | Kanevsky et al. | 719/319 |
| 8,020,150 | B1 * | 9/2011 | Han et al. | 717/124 |
| 8,281,323 | B2 * | 10/2012 | Dash et al. | 719/319 |
| 8,484,453 | B2 * | 7/2013 | Ekambaram et al. | 713/100 |
| 8,484,616 | B1 * | 7/2013 | McCann et al. | 717/120 |
| 8,554,956 | B1 * | 10/2013 | Wieland | 710/8 |
| 2002/0078260 | A1 * | 6/2002 | Hart | G06F 9/544 719/329 |
| 2003/0065976 | A1 * | 4/2003 | Bennett | G06F 8/53 714/35 |
| 2007/0050765 | A1 * | 3/2007 | Geisinger | 718/1 |

(Continued)

OTHER PUBLICATIONS

B. Poess, Binary device driver reuse. Master's thesis, Universitat Karlsruhe (TH), 2007.Tanenbaum, A.S.; Herder, J.N.; Bos, H., "Can we make operating systems reliable and secure?," Computer , vol. 39, No. 5, pp. 44,51, May 2006.*

(Continued)

*Primary Examiner* — Hugh Jones
*Assistant Examiner* — Robert Brock
(74) *Attorney, Agent, or Firm* — Browdy and Neimark, PLLC

(57) ABSTRACT

A method for controlling a peripheral hardware device connected to a computer system is disclosed, the computer system includes a first operating system, acting as the host operating system, running on a first processor platform, and a generic device driver operating on the combination of the first operating system and first processor platform. The method includes delivering the peripheral hardware device with an original peripheral hardware device driver file written for a second operating system or a second processor platform, handling, by the generic device driver, interfaces between the first operating system, the peripheral hardware device and a software application, all configured to interact with the original peripheral device driver file, and emulating, by the generic device driver, at least a part of the second operating system and the second processor that are required for the peripheral hardware device to operate on the first operating system and the first processor.

15 Claims, 20 Drawing Sheets

(56) References Cited

U.S. PATENT DOCUMENTS

| | | |
|---|---|---|
| 2007/0271557 A1 | 11/2007 | Geisinger |
| 2008/0028401 A1 | 1/2008 | Geisinger |
| 2009/0089815 A1 | 4/2009 | Manczak et al. |
| 2011/0119666 A1 | 5/2011 | Flynn |
| 2013/0160032 A1* | 6/2013 | Dan .............................. 719/327 |

OTHER PUBLICATIONS

Cova, M.; Felmetsger, V.; Banks, G.; Vigna, Giovanni, "Static Detection of Vulnerabilities in x86 Executables," Computer Security Applications Conference, 2006. ACSAC '06. 22nd Annual, vol., No., pp. 269,278, Dec. 2006.*

Lin Tan; Chan, E.M.; Farivar, R.; Mallick, N.; Carlyle, J.C.; David, F.M.; Campbell, R.H., "iKernel: Isolating Buggy and Malicious Device Drivers Using Hardware Virtualization Support," Dependable, Autonomic and Secure Computing, 2007. DASC 2007. Third IEEE International Symposium on, vol., No., pp. 134,144, Sep. 25-26, 2007.*

Joshua Levasseur and Volkmar Uhlig and Jan Stoess and Stefan Gotz, Unmodified Device Driver Reuse and Improved System Dependability via Virtual Machines, Proceedings of the 6th Symposium on Operating Systems Design and Implementation, San Francisco, CA, Dec. 2004, University of Karlsruhe, Germany.*

Hao Zheng; Xingjun Zhang; Endong Wang; Nan Wu; Xiaoshe Dong, "Achieving High Reliability on Linux for K2 System," Computer and Information Science (ICIS), 2012 IEEE/ACIS 11th International Conference on, vol., No., pp. 107,112, May 30-Jun. 1, 2012.*

Rong Chen, Zhijun Hao, Kang Liu, Haibo Chen and Binyu Zang. Safe Binary Device Driver Reuse via User-level Binary Translation. In Proceedings of 15th International Conference on Architectural Support for Programming Languages and Operating Systems (ASPLOS'10, poster), Pittsburgh, PA, Mar. 13-17, 2010, 1 page.*

Vella, Simon, "Device Driver Visualization", A dissertation submitted in fulfillment of the degree of Master of Science, Department of Computer Science & A.I., Faculty of I.C.T., University of Malta (2011), 232 pages.

Vella, Simon, "An automated reuse framework," 2004, 4 pages.

* cited by examiner

SYSTEM AND METHOD FOR CONTROLLING MULTIPLE COMPUTER PERIPHERAL DEVICES USING A GENERIC DRIVER

FIELD

A system and method for controlling multiple computer peripheral devices using a generic driver is described, specifically, a system and a method for a single generic peripheral device driver to emulate the flow of requests to and from the operating system and so control all connected peripheral devices. The present invention relates generally to digital communication between a computer system and peripheral devices and in particular to a method that allows the use of a single generic device driver to control multiple peripheral hardware devices.

BACKGROUND

Peripheral computer hardware such as printers, scanners, modems, etc, and their appropriate software are not integral parts of a computer or its operating system. As supplementary devices not integral to the system, they are not already programmed into the operating system, and so need their own specific code to allow them integrate into the system. These specific code packages are referred to as device drivers, and are delivered with the purchase of each new device. In many cases the operating system itself locates and downloads the appropriate device drivers so the users do not have to do this themselves—these are known as plug and play systems, so called because you simply "plug" it into the system, which then locates the driver enabling the device to start to "play". This works because a large number of device drivers are bundled with the Operating System ("OS") for the latest Windows OS versions in particular, and the feature for finding the driver needed automatically by searching online repositories is also included. This means that a user can simply connect a new device without having any driver, and the OS will manage to "make it run" automatically without any user intervention.

Device drivers handle and control the interaction with the hardware platform and operating system with which they work. Usually one device driver can handle only a single operating system version and only a single hardware/processor platform. Because of this limitation, whenever a device needs to be run either on a different operating system (or different version) or on a different hardware platform, a new device driver (or an update if available) is needed or the device will not run.

The great majority of device drivers are designed to work in kernel-mode, meaning that when a device driver crashes, it is very probable that the whole system will crash, generating a blue screen. Also, if malicious code is inserted within a driver and is executed once that driver has been installed, the malicious code can access all of the kernel and central processing unit (CPU) components because it is run in kernel mode. So should a driver containing a virus be installed, it is very likely to have disastrous and potentially fatal effects on the underlying platform.

To ensure that drivers installed on operating systems contain no defective, incompatible or malicious code, operating system vendors have introduced measures to control drivers that are installed on them. An example is the Microsoft® Windows® driver signing process. Microsoft® signs drivers that it deems to be 100% compatible with Microsoft® Windows® operating systems, and have no unsafe code. During installation, a device driver that is not signed is rejected. There are two problems with this approach. First, driver signing is expensive for hardware vendors. Second, hardware vendors must hand their drivers to the operating system's vendor for inspection. This can give rise to the feeling of unwanted interference by the operating system's vendor from the point of view of the hardware vendor.

In typical network environments, only users with administrator rights are allowed to install devices. This limitation is applied so that no user can install unsafe drivers that can influence the server and network experience of other users of the same server or network. As it is impossible to give administrator rights to every user for obvious security reasons, this limitation prevents users from installing their own personal peripheral devices without having to go through the administrator.

The present invention was inspired by the fact that peripheral hardware devices and the appropriate software are distributed with their own individual device drivers, which in most cases are written for a single operating system (or at most a very small number of operating systems). Yet today the list of possible devices that can be added to a modern computer system is virtually endless. Even the more basic systems set up in a user's home will probably have a number of peripheral devices added, such as printers, scanners, external hard disks, etc. Each of these devices needs a device driver. When this is expanded to a multiple user and server corporate network, the number of installed device drivers can be practically impossible to properly maintain and keep up to date. If there are frequent driver conflicts, this can seriously restrict the day to day operation of a large network.

To provide more depth as to how a solution to the above described problems can be applied, it is necessary to provide more of a context on the drivers and how they operate.

FIG. 1 gives an overview of the runtime context of a conventional device driver. The applications (110) wishing to use a universal serial bus (USB) device (100) sends a driver use request (120) to the host operating system (140) within the host operating system runtime environment (102). The USB controller (105) obtains information from the USB device (100), enumerates it, adds in events such as hardware interrupts (170), and passes this on to the host operating system (140).

The host operating system (140) then communicates with the device driver (150) via system calls and kernel application programming interfaces (APIs) calls (195) and the driver model (130) to obtain the information needed to control the USB device (100). Where required, function calls (185) are further placed to other drivers or kernel-level dynamically loaded files (.sys/.dll) (180) for necessary data.

The response from the device driver (150) returns to the host operating system (140) and then back to the USB device (100) routed through the input/output (I/O) ports (190).

Finally, a set of assembly instructions (165) specific to the processors for which it was developed that access and manipulate the underlying hardware resources, such as the processor's registers and memory, are sent from the device driver (150) to the host processor CPU (160). The processor's instruction set allows a driver to manipulate its I/O ports. However, in this conventional driver model, device drivers do not manipulate ports directly, as this is usually done by the underlying bus drivers.

The context of the device driver (150) can be defined by analyzing the entities with which it communicates and how this communication takes place. The first entities are the applications (110) controlling the device (100) (for simplicity only one application will be referred to in the text below).

When a user accesses the application to impact certain features or functions of the device, it seems as if the application (110) is controlling the device (100). However, the process is not that simple. When the user executes a function on the device, the application (110) forms a device request package (120) that contains information about the device, the data to send to the device and other relevant information. It sends this package (120) to the host operating system (140) on which it is currently running (e.g., Microsoft® Windows®) through a device Input/Output (I/O) Control function call that is part of the operating system's standard set of API calls. The APIs can be seen as the only way that applications can communicate with the operating system's kernel, and the only way for applications (110) to communicate with the CPU (160) resources and devices is by calling these APIs.

Once the application (100) sends this device request package (120) to the host operating system, it waits for a return value that indicates whether or not the request has been successful. Any operations performed by the kernel and any other components with which it communicates are abstracted from the application (110). So from the point of view of the application, if the value returned by the device I/O control indicates that the operation has been successful, it assumes that the attribute has been changed to the one requested. If the value indicates an unsuccessful operation, there are ways for the application (110) to get more information about what type of failure occurred. The host operating system (140) thus acts as an intermediary between the application (110) and the device driver (150). The host operating system (140) presents the information that the application (110) inserted in the request package into a different standard package. This package then presents the information that the driver (150) needs to control the device (100). This communication will be discussed in more detail later.

From the hardware point of view, there are instances in which a USB device (100) needs to communicate to the device driver (150) to notify the driver of an external event that has happened. As in the case of the communication between the application (110) and the driver (150) above, the host operating system (140) acts as intermediary between the device (100) and its driver (150). The host operating system (140) enumerates events such as hardware interrupts (170) that can be generated by connected devices (100). The USB controller (105) contains an enumeration of all USB devices (100) connected to it, and adds information indicating which USB device (100) generated the interrupt (i.e., the device's descriptor). The USB controller (105) then waits for the host operating system (140) to perform the appropriate action. So ultimately the device driver (150) is the component that controls the response actions that the device (100) must take.

Whenever a USB device (100) is connected, a similar procedure takes place when the USB controller (105) detects the new device (100), in that it obtains information about the new device, enumerates it and then informs the operating system (140) about it. The reverse process happens when a USB device (100) is disconnected, and similar processes happen when a device (100) is powered on and off, set to or resumed from the sleep state.

The above scenario explains generally how hardware interrupts allow the communication from the devices to the host operating system. The reverse type of communication—from the host operating system (140) to the USB devices (100)—is done through I/O ports (190). The host operating system (140) passes both a control instruction (i.e., the instruction for the device to execute a function) and data (the description of specific parameters necessary for the requested function) through I/O ports (190). I/O ports (190) can also be used in the reverse direction (from the device to the host operating system) and data communication can also be handled by the host operating system through memory mapping. However, details about these functions are unnecessary to the understanding of the subject matter of this application. In summary, the host operating system (140) abstracts communication with the device driver (150) from the USB device (100) and USB controller (105). This means that it does not matter which device driver (150) is handling a particular device (100) as long as the USB device (100) and USB controller (105) can communicate with the host operating system (140) in the standard way specified.

By looking at these two scenarios (communication to/from the application and to/from the device) from the device driver's point of view, one can appreciate more the abstractions offered by the operating system that allows device drivers to be built in a standardized way according to the operating system they run on and not specifically according to the device they control. Every operating system provides a driver model that simplifies driver implementation (such as the Microsoft® Windows® driver model, or WDM). The functionality of the driver is implemented within a series of dispatch routines and some other special functions. Thus, for example, there is a standard function (dispatch routine) that is called when the application calls the device I/O control command, another standard function that is called when the device is connected, another when the operating system starts up, and so on. So from the point of view of the driver it does not make a difference if the source of the request is originating from an application, from the operating system itself, or from the hardware platform currently hosting the device.

Inside the implementation of these "special" functions, the device driver implements all of the functionality needed by the device depending on its features. However, the host operating system (140) provides a number of system calls or kernel-level APIs (195). These are similar to the APIs used by the applications (as already described); however, unlike those used by the applications, they are only accessible at the kernel-level, as they manipulate kernel resources that are not available for applications. As a result, while the driver (150) is servicing a request coming from the host operating system (140), it calls the host operating system (140) again to perform generic tasks. These tasks are mostly memory operations, such as the allocation and freeing of chunks of memory.

Apart from the kernel APIs (195), drivers can also call functions from kernel level dynamically loaded libraries (180), via function calls (185). These libraries are not part of the kernel and can also be developed by third party developers. However, when the device driver (150) is loaded, the operating system (140) loads these libraries (180) inside the kernel so that their functions are available for the device driver (150) to call. These libraries (180) can even be drivers themselves. For example, most digital camera device drivers use a generic camera driver that provides general functionality for every camera.

The final line of communication happens between the device driver (150) and the host processor (160) itself. The driver's internal code is made up of a set of assembly instructions (165) that are specific to the processor for which it was developed. So, for example, if a device driver was developed to run on an Intel® Pentium processor, its internal code will be a set of Intel® x86 assembly instructions. These instructions access and manipulate the underlying hardware resources, such as the processor's registers and memory. It should be noted that the processor's instruction set allows a driver to manipulate its I/O ports. However in the conventional driver model, device drivers do not manipulate ports directly, as this is usually done by the underlying bus drivers.

Due to the large number and variations of possible devices that can be connected to a computer system and the possible range of versions, platforms and systems with which they may be compatible, it is not possible to have dedicated device driver software for all possible devices contained within the operating system. The present invention solves this problem by providing one generic driver that handles all the interfaces involved in communication between the peripheral device and the system, therefore eliminating the need to have multiple device drivers installed for each version, platform and system in use, ensuring that while using the generic driver, the user is not putting the system's stability or security at risk in any way. If this happens, the generic driver either finds a way to obtain the same functionality without such breaches, limits its functionality, or stops the device.

The generic driver will detect whether any part of the functionality implemented within the device driver puts the underlying platform's security or stability at risk. If a security or stability risk is identified, then the action taken depends particularly on the type of stability or security risk identified. Possible actions that can be taken when such a breach is detected may include: 1) stopping the driver from performing the task that might cause the breach and showing a warning to the user (instead of allowing it to crash the whole system); or 2) taking alternative action that would allow the driver to continue performing the required task in a safe way. To do this, every type of breach would have to be analyzed individually, and the alternative action would have to be customized for every type of breach.

No research about individual cases causing these risks has yet been done, although a good idea can be obtained by looking at what Microsoft® is developing with Static Driver Verifier, Driver Verifier and Pre FAST discussed below. The main difference between these tools and the system shown here is that these tools are used by developers to help them produce better drivers—i.e., having the least possible system security/stability breaches. If a developer tests their driver and a security or stability breach is detected, then they can modify the driver code. The generic driver acts on drivers already distributed to users and hence their sources cannot be modified.

Other attempts have been made to address the situation where peripheral hardware devices should be able to run under an operating system for which no corresponding device driver is available. But these solutions are much more limited in scope than the present invention, and as such fall short of the capability of the generic driver solution that is disclosed here.

NDIS Wrappers for Linux® and BSD—NDIS Wrapper is an open-source project that aims to make NDIS-compliant NICs (Network Interface Cards), whose only available driver is for Microsoft® Windows®, run on Linux® and BSD. Its scope is limited to NICs and it executes drivers' local instructions directly on the host. This means that as it does not provide emulation, and it cannot handle drivers across different hardware platforms.

WINE32—WINE32 emulates Microsoft® Windows® APIs to run Microsoft® Windows® applications on Linux® and other POSIX-compliant operating systems. However it does not emulate kernel APIs and, as in the case of the NDIS Wrapper, it does not provide instruction emulation, because the hardware platform interoperability problem is not that significant for application-level programs. This means that through WINE32, an application for Microsoft® Windows® that controls a particular device can work on Linux® only if the corresponding Linux® driver is also installed on the system.

React-OS—React-OS is a project whose objective is to implement an operating system containing all the interface functionality of Microsoft® Windows®. It is not intended to be a Windows® clone; instead, it attempts to imitate Windows® behavior to such an extent that any hardware and software can run on or be handled by it in an identical way as in Windows®. So theoretically, a device without a driver that can handle it on Linux® can still run on Linux® by installing React-OS on Linux® as a guest operating system, and then installing its driver on the guest. However, this involves buying and installing a whole operating system and not just what is needed to make the device work. Also this solution does not provide the instruction emulation that makes cross-hardware-platform emulation possible.

LibUSB—LibUSB is an API that allows user level applications to access a USB device without needing to have a device driver actually installed on the system. It provides an interface containing a number of functions that can be called, each of which provides generic functions such as detecting plugged USB devices, transferring data packets through the USB hub to and from a USB device, etc. While it is true that some devices can work without having a driver available, only generic functionality is implemented within LibUSB, meaning that any particular functionality provided only by the device driver will not work. Again, this solution does not provide instruction emulation.

Various patents and patent applications also provide insight into what has gone before. See for example, U.S. Pat. Nos. 7,558,723; 7,437,613; 6,393,495; 6,269,408; and U.S. Patent Application Nos. 2009/0089815; 2011/0119666; 2008/0028401; 2007/0271557; and 2007/0050765; the entireties of which are incorporated by reference herein.

SUMMARY

An object of the invention is to present the generic driver to the host operating system as the device driver so that when the device is installed, the host operating system accepts the generic driver and allows its installation.

Another object of the invention is to analyze Microsoft® Windows® x86 drivers and other driver files that are delivered with a peripheral device, and represent them in a format that the generic driver understands, so that the generic driver can use the original driver files themselves as "instruction books" to handle the devices itself.

Another object of the invention is to make the generic driver handle all the interfaces with entities (applications, operating systems and devices) that interact with all the device drivers being emulated, so that these entities believe that they are communicating with the actual device driver and not with the generic driver.

It is another object of the present invention to provide a method and system that implements one driver—the generic driver—handling all the interfaces mentioned in the previous section. This generic driver will be installed instead of the original device driver, but the original device driver is still needed by the generic driver in order to handle the device's functionality.

One object of the present invention is presenting the generic driver to the host operating system as the device driver so that when a device is installed, the operating system accepts the generic driver and allows its installation.

According to one embodiment of the present invention, a method is provided for controlling a peripheral hardware device connected to a computer system, the computer system comprising a first operating system, acting as the host operating system, running on a first processor platform, and a generic device driver configured to operate on the combination of the first operating system and first processor platform, the method comprising delivering the peripheral hardware device with an original peripheral hardware device driver file written for at least one of a second operating system and a second processor platform, handling, by the generic device driver, interfaces between the first operating system, the peripheral hardware devices and at least one software application, all of which are configured to interact with the original peripheral device driver file, emulating, by the generic device driver, at least a part of the second operating system and the second processor that are required for the peripheral hardware device to operate on the first operating system and the first processor.

According to one embodiment, the method further includes presenting the generic device driver to the first operating system as being a device driver best suited for a particular hardware device, in place of the original peripheral hardware device driver. By best suited is meant a device driver that can control the particular hardware device to perform the particular operations for which it was intended.

According to one embodiment, the method further includes extracting input required for operation of the generic device driver from the original peripheral hardware device driver file.

According to one embodiment, the method further includes examining, by the generic device driver functionality of the original peripheral device driver as to security and stability issues for interaction on the first operating system and processor platform. Through instruction emulation and kernel API emulation, safer execution of drivers is possible. The present invention is designed to improve execution of the drivers to reduce driver and system crashes.

According to one embodiment, the method further includes deriving input to the generic device driver from the original peripheral device driver, the step of deriving comprising the steps of parsing the original peripheral device driver file, disassembling a code section within the original peripheral device driver file using a disassembler appropriate to the combination of the operating system and processor platform for which the original peripheral device driver was written, and storing the found information in a form that is readable by, and can be interpreted by the generic device driver.

According to the present invention, the method further includes emulating all the instructions that are extracted from the original peripheral device driver using the instruction emulation functions in a virtualized guest system.

According to the present invention, the method further includes emulating all the APIs that are extracted from the original peripheral device driver using the API Forwarder/Mapper/Emulation functions in a host system.

According to the present invention, all the instructions that are extracted from the original peripheral device driver are emulated using the instruction emulation functions in a virtualized guest system.

According to one embodiment, all the APIs that are extracted from the original peripheral device driver are emulated using the API Forwarder/Mapper/Emulation functions in a host system.

According to one embodiment, the computer system has at least one universal serial bus port (USB port) for use in the input and output of data, and wherein the peripheral hardware device is connected to the computer system by means of the USB port, According to one embodiment, the combination of the second operating system and second processor platform is the same as the combination of the first operating system and the first processor platform.

A computer program and computer system for performing the inventive methodology are also provided.

BRIEF DESCRIPTION OF THE DRAWINGS

For better understanding of the invention and additional objects and advantages thereof, reference is made to the following detailed description and accompanying drawings of embodiments.

DETAILED DESCRIPTION

Figure 1:
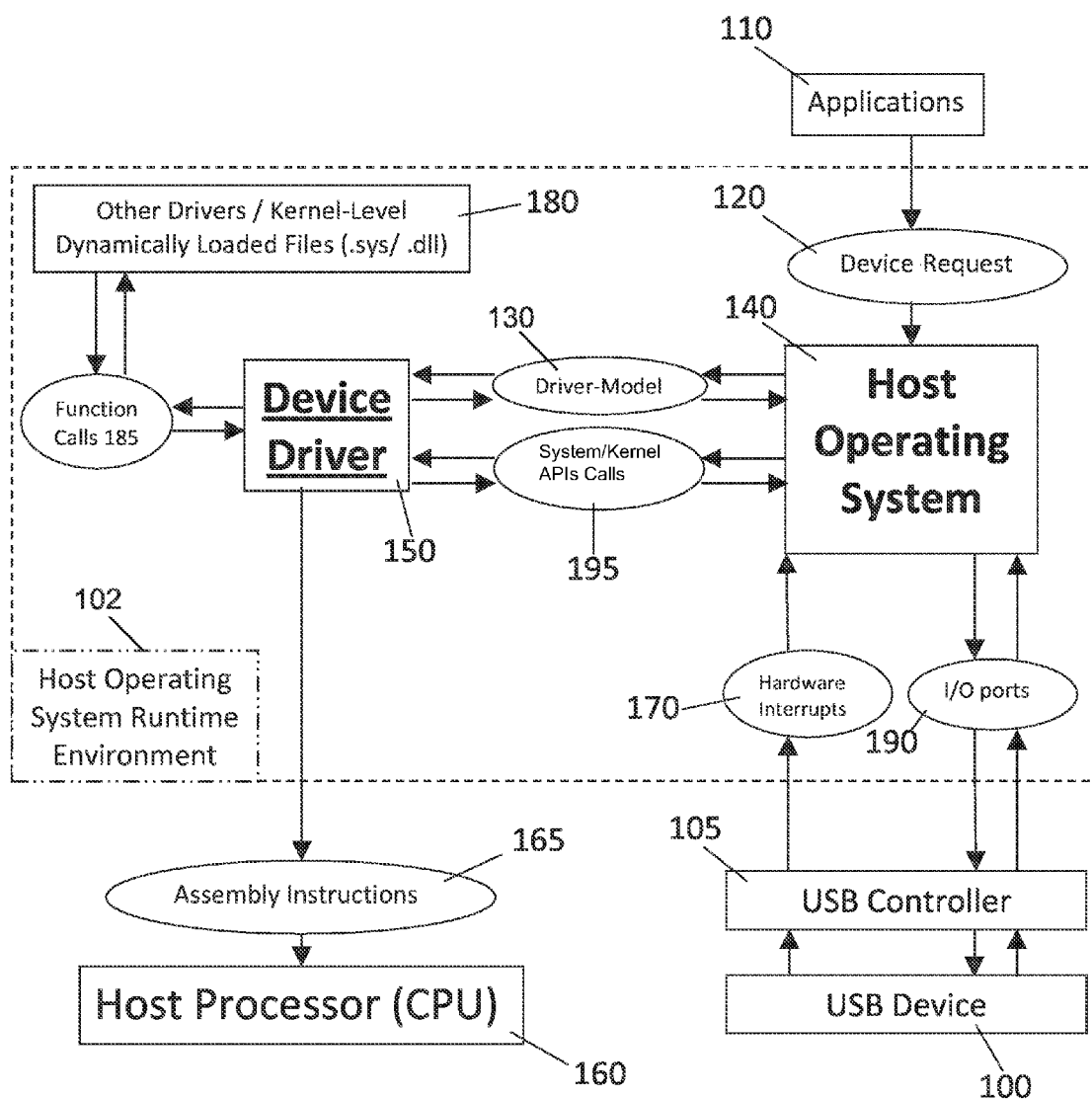
FIG. 1 is an overview of the runtime context of a conventional device driver.

The driver model (130) in FIG. 1 refers to the communication structure between the host operating system (140) and device driver (150) specified by the operating system driver model. In particular, the driver model specifies: 1) the system and/or device events that cause the operating system to call the driver; 2) the data that the operating system passes to the driver when calling it; and 3) the data that the driver must return to the host operating system when it finishes performing any function after a call by the operating system.

Figure 2:
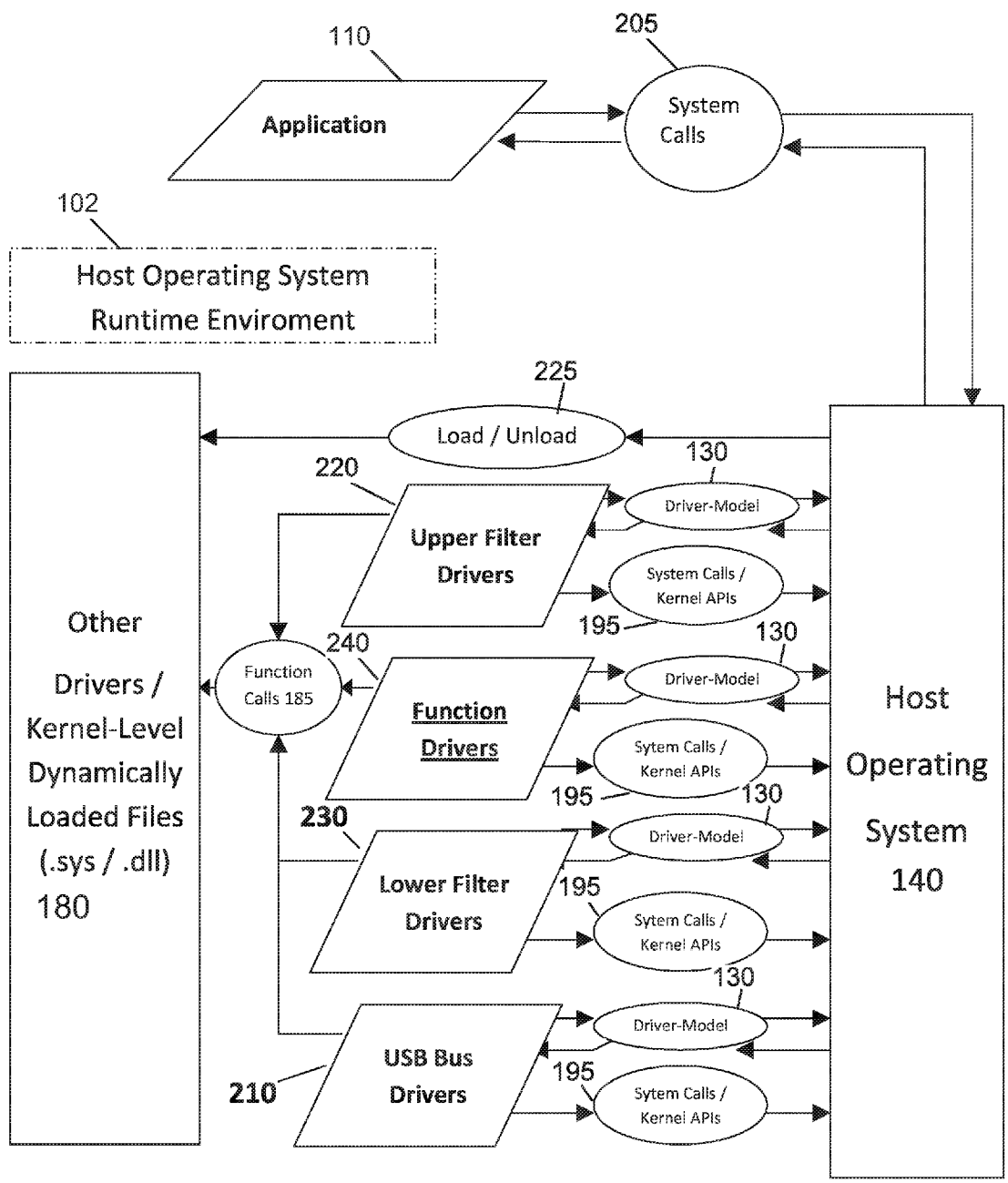
FIG. 2 is a schematic diagram showing how the conventional device driver interfaces with other programs.

The layered driver model is the basis of the driver model for every operating system, not just Microsoft® Windows®. Although usually a device driver is referred to as the single entity that controls the device, this is not specifically true. As shown in FIG. 2, peripheral devices are usually controlled by a chain of drivers arranged in layers, hence the term "layered driver model" (elements having the same function will be referred to using the same reference numbers in each figure, and any description thereof will be omitted, except where necessary). Every layer either controls a physical component or a functional component related to the device. For example, USB devices will always have the USB bus driver (210) in their driver-chain. This controls the USB bus and all devices connected to it. Class (or function) drivers (240) are more related to the functional aspects of a device. For example, a particular hardware vendor can implement a class driver for all its devices into which some functionality common to all or most of its devices is inserted. This driver is then inserted in the chain so that the manufacturer's device drivers do not contain repetitive code. Filter drivers (both upper (220) and lower (230)) can contain added functionality or corrective implementation. These can even be inserted into the chain after the device driver has already been installed.

The application (100) places the request for device use to the host operating system (140) via system calls (205). Within the host runtime environment (102), these requests are passed on from the host operating system (140) through the driver-models (130), to the upper (220) and lower (230) filter drivers, the function driver (240) and the USB bus drivers (210) to form function calls (185) and then other drivers or kernel level DLL files (180). The filter drivers (220) and (230), the function driver (240) and the bus drivers (210) return information to the host operating system (140) via system/kernel APIs calls (195). The load/unload function (225) refers to the process of creating a run-time instance of a driver or any kernel-loadable module, and 'installing' it within the kernel. As an example, when starting up Windows®, all device drivers and kernel modules needed to handle all of the kernel's needs (including the handling of all device currently attached to the platform) are loaded. For every such module/driver, all of the other kernel modules (180) that it depends on to be able to run adequately, also need to be loaded. On Windows® shutdown, all of these are unloaded. Should a device be uninstalled, its driver, and any other drivers/kernel modules with which it exclusively communicates are also unloaded.

From a developer's point of view, then, whenever we talk about "device driver" we are always referring to the "function driver". However, when we talk about the process of "installing a device driver" (i.e., from a user's point of view), we are referring to the process of installing the whole chain of drivers (class drivers, filter drivers, function driver, bus driver). Thus, in a layered driver model, the device driver can be treated as the whole chain of drivers. The bus driver is usually already installed on the system. Class drivers can either be installed already or else be distributed as part of the device driver package. Filter drivers (both upper and lower) are either distributed with the device driver, or else they can be distributed and installed at a later stage on the system on which the device driver has already been installed.

In standard operating systems, for example, in Microsoft® Windows®, device drivers do not have to worry about what other drivers are layered above and below it during runtime. The driver always gets called directly by the operating system (through dispatch routines and interface functions as already described), and returns values to the operating system. The host operating system then passes data to the drivers above and below as needed.

The host operating system must identify other external drivers and kernel modules that are called by the drivers during device installation, as well as installing the whole chain of drivers controlling a device. The host operating system must first load these other drivers and modules, unless they are already loaded. On device un-install, if these drivers and modules are not used by other device drivers, the host operating system unloads them.

After analyzing the main components of the driver context, one can see that there are two major entities with which the driver interfaces—the underlying operating system and the processor. A third (minor) entity consists of the kernel-level components (such as libraries and/or drivers) that are external to the kernel. These are considered to be minor entities mainly because the operating system is in charge of identifying and loading such components. This can also be deemed to be part of the communication with the operating system.

The following are some situations where the generic driver according to the present invention would be valuable.

A user would like to migrate to a different operating system but the migration is held back by the knowledge that one or more of the peripheral devices will not work (i.e., are not supported) on the new operating system. The generic driver can be used to handle these devices and make them work on the new operating system.

A business center has an expensive device that is not supported by the operating system following an upgrade to a newer version of that same operating system. The generic driver can be used to handle this device and make it work on the new operating system.

A business center has an expensive device that it needs to continue using. However, the hardware vendor has stopped supporting it and the center would like to switch from an x86 server to a new 64-bit server based on a different architecture (for example, Itanium®). The generic driver can be used to handle this device and make it work on the hardware architecture and any further platform changes that may occur in the future, even though support is no longer available from the vendor.

A device driver running on a system is crashing the system because some of its code is defective. The device driver is emulated through the generic driver so that it is prevented from crashing the whole system and just gracefully stops the device from running whenever defective code is encountered.

An IT company uses a network in which users work remotely on the server through thin clients. A thin client (sometimes also called a lean or slim client) is a computer or a computer program that depends heavily on some other computer (its server) to fulfill its traditional computational roles. The administrator would like to enable all users to be able install and use personal devices on the server by connecting them to their thin client. However, the overall stability of the system cannot be compromised. The generic driver together with a USB Device Redirection system can be used to allow users install their devices in emulation mode from their thin client location and use these devices without being able to either bring the system down or affect the server experience of any other user.

A user has a device whose driver is not signed by the vendor of the operating system running on the system because it contains dangerous or defective code. Hence, the user cannot use this device. Using the generic driver (assuming that it is signed by the operating system vendor), the device driver can be emulated without putting the stability of the host operating system at risk. Should dangerous code be encountered during emulation, a work-around can be provided by the generic driver, or else the driver will be stopped gracefully.

It can be said that a device driver's role is that of making the device's features and functionality work on a particular combination of hardware and software platforms. The hardware platform is the processor, while the software platform is the operating system. The generic driver (350) is installed so that it handles the interfacing with the underlying software and hardware platforms. It then references the actual device driver's binary file—which is not installed on the system—in order to obtain information about how to handle the device's features and functionality and actually make it work.

A component of the generic driver (350) is the driver analyzer (400), which is able to parse the contents of the device driver binary file, and use it as an "instruction book" for handling the device. This means that the binary file is never installed directly on the system but is used exclusively by the generic driver (350), and as a result no internet access is required.

As most peripheral device are delivered with drivers for Microsoft® Windows® operating systems and x86 processor platforms in the following considerations, it is assumed that the device driver is a Microsoft® Windows® driver. This assumption is only an exemplary embodiment of the present invention. For example, the device driver could be one that enables the device to operate on Apple® Macintosh® computers, or any other type of system that may be developed in the future. Persons skilled in the art should easily be able to apply various modifications and changes to implement the invention on future systems.

The generic driver (350) is implemented so as to be able to understand information stored within a Microsoft® Windows® x86 driver's binary file. It is then implemented and compiled to work on the target platform using the Microsoft® Windows® x86 drivers which the device needs to function. This target platform may also be a x86 processor platform with Microsoft® Windows® operating system, or it may also be a completely different platform, for example a platform with an Intel® Itanium® (64-bit) processor and BSD operating system. One objective of the generic driver (350) is to make the peripheral device work on an Itanium® (64-bit) BSD platform. Thus, the generic driver (350) is implemented and compiled for Itanium® as a hardware platform and BSD as a software platform. Intermediary solutions are also possible and useful. The following table shows possible platform scenarios where a device with a Microsoft® Windows® XP x86 driver can function:

TABLE I

| Software Platform<br>Hardware Platform | Same<br>Operating<br>System | Different<br>Operating<br>System Version | Different<br>Operating<br>System |
|---|---|---|---|
| Same Processor<br>Platform | Windows ®<br>XP<br>x86 | Windows ®<br>Vista/7<br>....2008.....<br>x86 | FreeBSD/<br>Linux ® ....<br>x86 |
| Extended Processor<br>Platform | Windows ®<br>XP<br>x64 | Windows ®<br>Vista/7<br>......<br>x64 | FreeBSD/<br>Linux ® ...<br>x64 |
| Different Processor<br>Platform | Windows ®<br>XP<br>Itanium ® | Windows ®<br>Vista/7<br>....<br>Itanium ® | FreeBSD/<br>Linux ® ...<br>Itanium ® |

Although the same operating system/same processor scenario does not make a device work on a different platform, it can still be useful, mainly to solve the security issues discussed in the background section of this document. The generic driver (350) detects whether any part of the functionality implemented within the device driver puts the underlying platform's security or stability at risk. For example, should the device driver contain instructions that can cause a blue screen, the generic driver (350) only executes these instructions after performing adequate checks to ensure that this cannot occur. In server scenarios, should a device driver contain functionality detrimental to other user's experience on the server, the device driver could be stopped. This makes it possible for any user to install a personal device on the network without the administrator's intervention. The generic driver (350) can be installed to handle these devices and make sure that while using a device, the user is not putting the system's stability or security at risk. If this happens, it either finds a way to obtain the same functionality without such breaches, limits its functionality, or it stops the device.

The following embodiment of the present invention describes the integration of peripheral devices in a computer system in case the device driver for a given peripheral device is only available for Microsoft® Windows® operation system. This described embodiment is an example only, and in practice a plurality of variations are possible, the implementation of which is within the skill of the ordinary artisan.

The solution can be divided into the following main components: 1) presenting the generic driver to the host operating system as the device driver so that when the device is installed, it accepts the generic driver and allows its installation; 2) analyzing Microsoft® Windows® x86 drivers and representing them in a format that the generic driver understands so that it can use the drivers as an "instruction book" to handle the devices itself; and 3) making the generic driver handle all the interfaces with entities that would interact with the device driver, making it seem to all these entities that they are communicating with the actual device driver and not with the generic driver.

Figure 3:
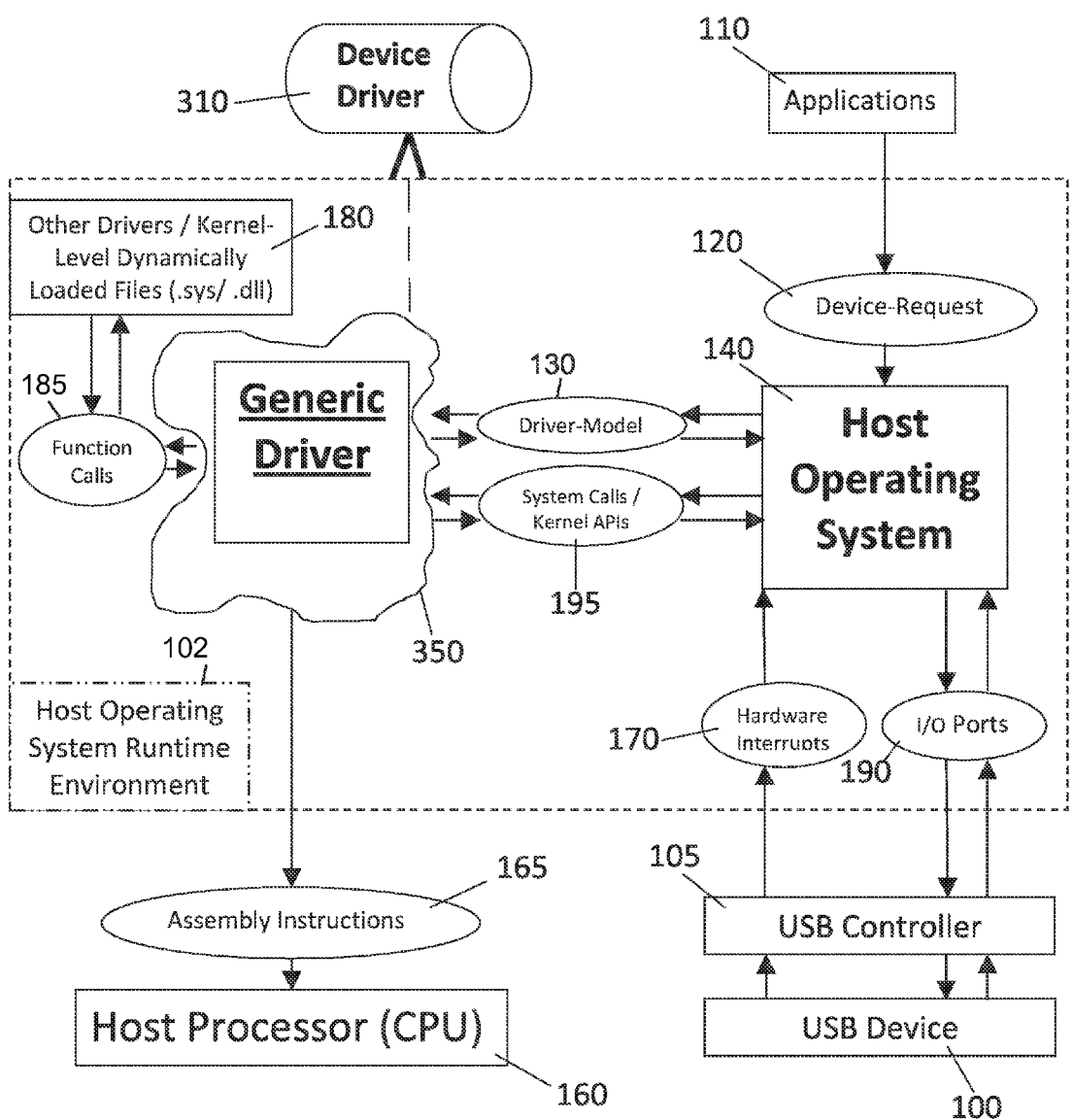
FIG. 3 shows how the generic driver integrates into the conventional environment.

FIG. 3 shows how the generic driver (350) integrates into the conventional environment according to the described exemplary embodiment of the invention. FIG. 3 is the same as FIG. 1, except that in FIG. 3, the device driver (150) has been replaced by the generic driver (350) according to the invention and the device driver to be emulated is referred to as device driver (350).

The application (110) wishing to use a USB device (100) sends a driver use request (120) to the host operating system (140) within the host operating system runtime environment. The USB controller (105) obtains information from the USB device (100), enumerates it, adds in events such as hardware interrupts (170), and passes this on to the operating system (140).

The operating system (140) then communicates with the generic driver (350) via system and kernel APIs calls (195) and the driver model (130) to obtain the information needed to control the device (100). Where required, function calls are further placed to other drivers (180) for necessary data.

The response from the generic driver (350) returns to the operating system (140) and then back to the device (100) routed through the I/O ports (190) and the USB controller (105). Finally, a set of assembly instructions (165) specific to the processor for which it was developed that access and manipulate the underlying hardware resources, such as the processor's registers and memory, are sent from the generic driver (350) to the host processor (CPU 160). The processor's instruction set allows a driver to manipulate its I/O ports.

Figure 4:
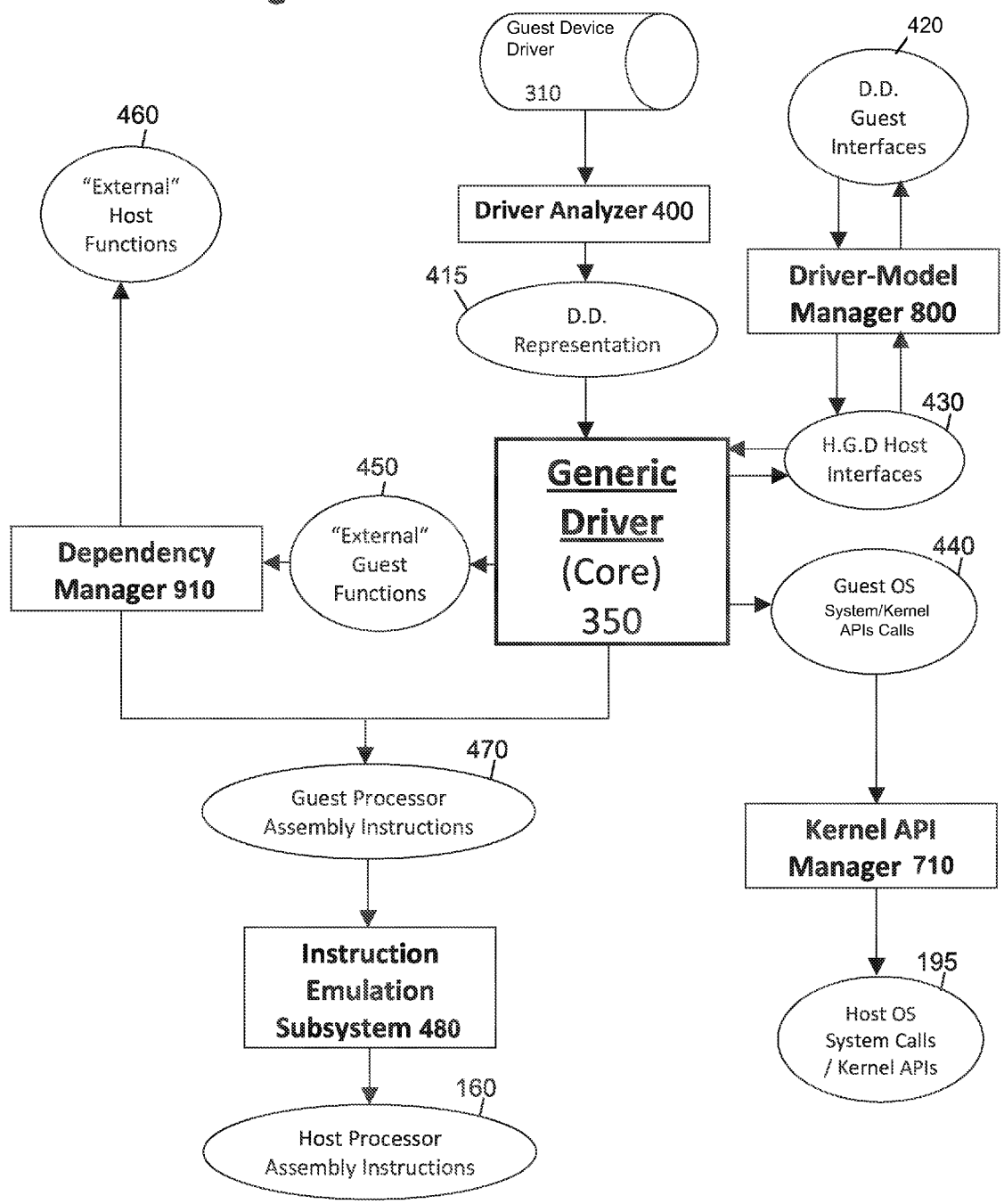
FIG. 4 illustrates the main components; interfaces and functions of the generic driver.

FIG. 4 illustrates an exemplary embodiment of the main components that make up the solution according to one embodiment of the present invention, i.e., the main components, interfaces and functions of the generic driver (350). For purposes of this description, the host system and its components refer to the computer in which the generic driver (350) is implemented. The guest system refers to the platform (i.e., the processor and the operating system) for which the guest driver (the driver being emulated) was developed and compiled. This is usually referred to as the guest driver's 'Target Platform'. This means that the guest processor assembly instructions (470) are the actual assembly instructions present within the guest driver's binary file. These are fed to the instruction emulation subsystem (480), which contains a 'partial' emulation of the target platform's processor. By 'partial' is meant that only enough emulation is included for the guest driver's instructions to be handled. So, for example, if the driver does not contain assembly instructions that access ports, there is no need for ports to be emulated.

Figure 7:
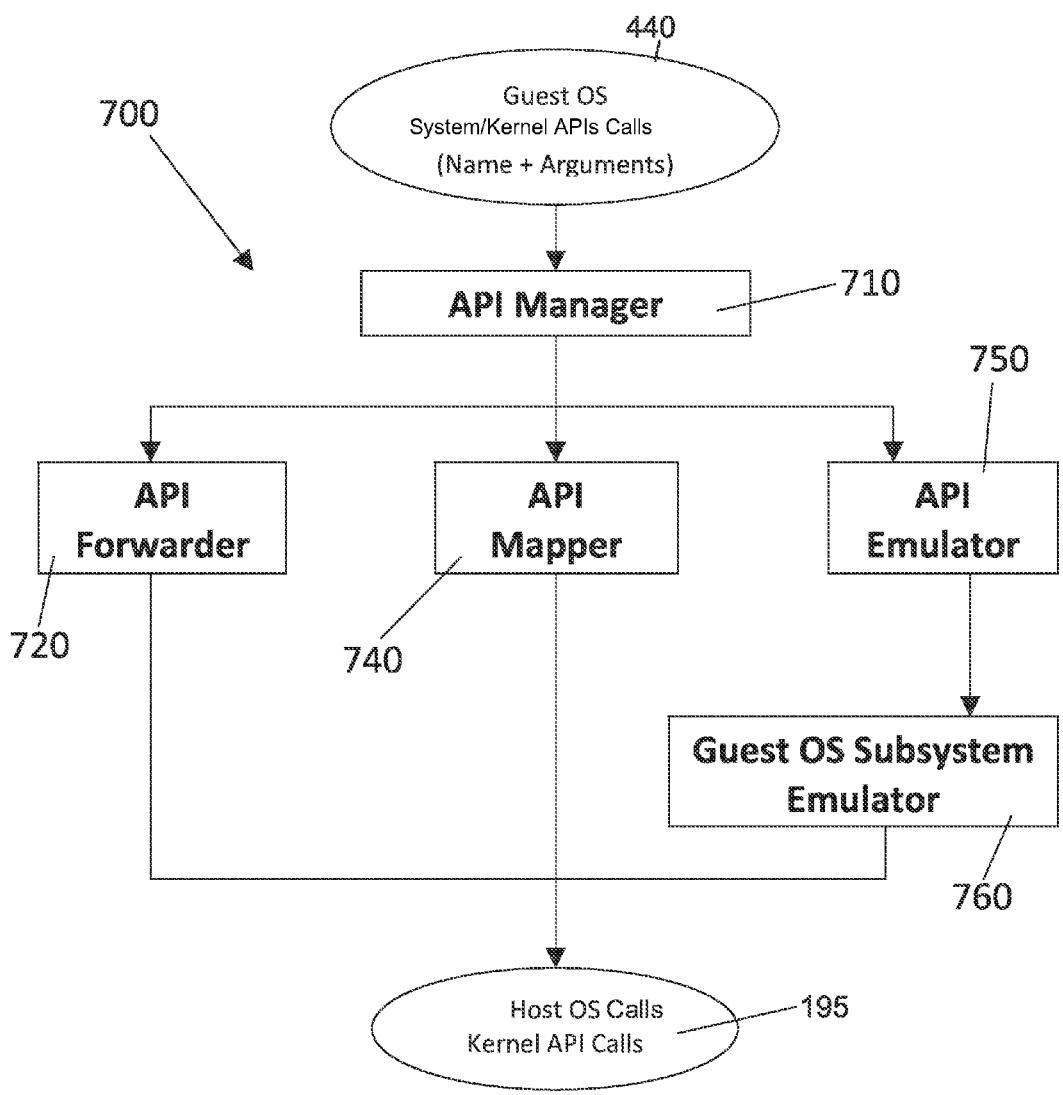
FIG. 7 is a schematic overview of the API subsystem according to the present invention.

Host operating system/kernel APIs kernel API calls (195) are kernel API calls from the generic driver (350) to the host operating system (140). The guest operating system/kernel API calls (440), refer to the kernel API functions called by the emulated device driver (310) (the name and the arguments therefor) to the guest operating system (not shown). For more information about the relationship between the host and guest APIs, see the API subsystem section as described with respect to FIG. 7. The kernel API manager (710) might actually contain an emulation of some subsystems within the driver's target operating system, but the only interest for the inventive system is that it translates the driver's kernel API calls into corresponding implementation on the host operating system that performs the same functionality. This implementation can be as simple as calling one single host API call that performs identical functionality. It can also be as complicated as including a complete emulation of a whole guest operating system subsystem.

According to the exemplary embodiment shown in FIG. 4, the device driver (310) sends a representation of itself (D.D. representation 315) through the driver analyzer (400) (see FIG. 5 for more detail) to the generic driver (350). According to one embodiment, standard XML can be used, but any type of representation would work as long as it presents information in a format that is easy to parse directly by other subsystems.

Specifically, the driver analyzer (400) analyzes the driver's contents (involving a lot of tedious parsing of binary codes stored within the driver's ".sys" file, the implementation of which is within the skill of the ordinary artisan) and creates a device driver representation (415) of these contents in a new format that is much easier for other components of the generic driver (350) to understand and parse. This will be explained for an exemplary implementation below.

The information obtained from the driver model managers (800) (see FIG. 8 for more detail) via the host generic driver (HGD) interfaces (430) is also input into the generic driver (350). The generic driver (350) uses the device driver representation (415) and the information received from the driver model managers (800) to send out guest operating system and kernel APIs calls (440) to the kernel API Manager (710), which outputs the operating system and kernel APIs calls (195) (see FIG. 7 for more detail).

The guest driver can contain calls to other drivers/kernel modules that are not part of the host operating system core—which will be referred to here as 'external modules'. These external modules have to be loaded together with the actual device driver for it to be installed directly on the host operating system. 'Actual device driver' refers to the guest device driver (310).

Figure 9:
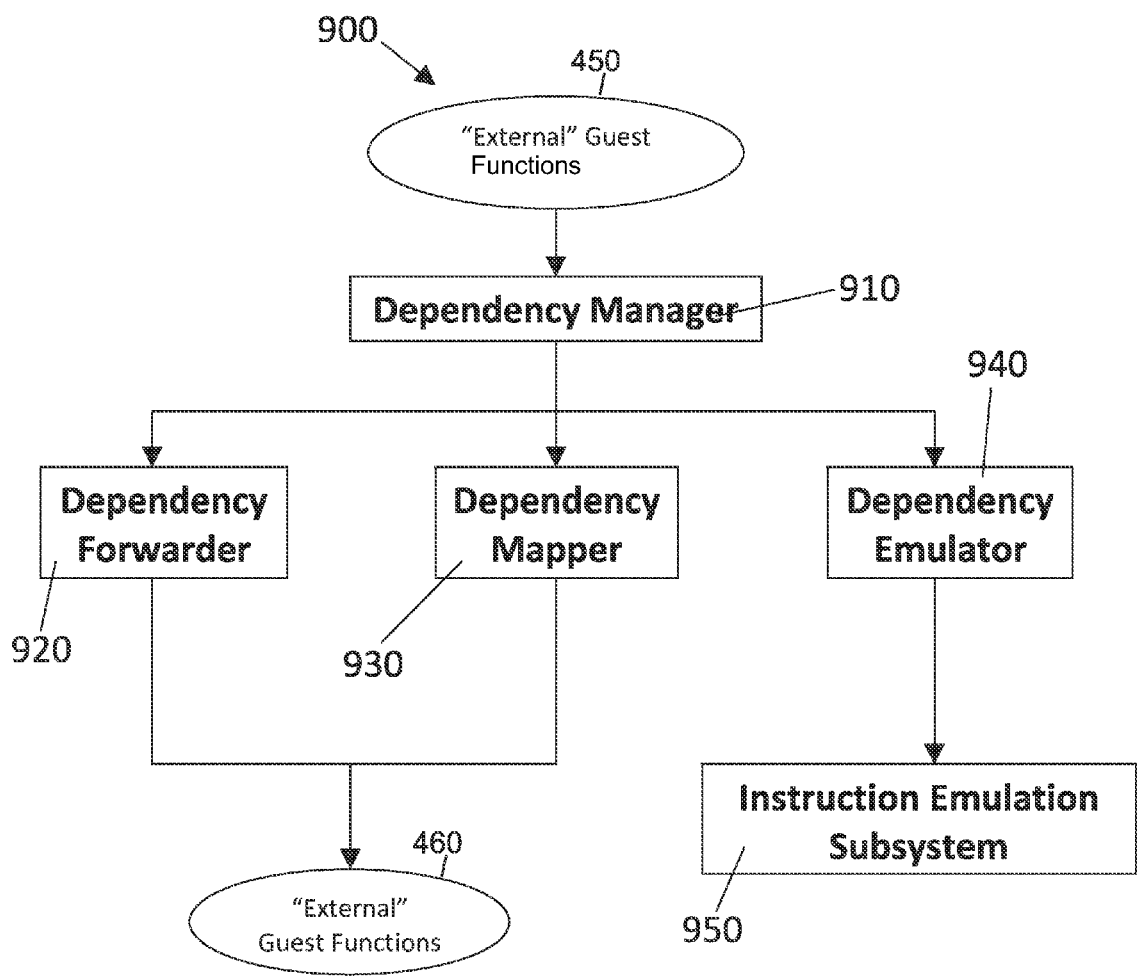
FIG. 9 is a schematic overview of the dependency manager according to the present invention.
Figures 10A, 10B:
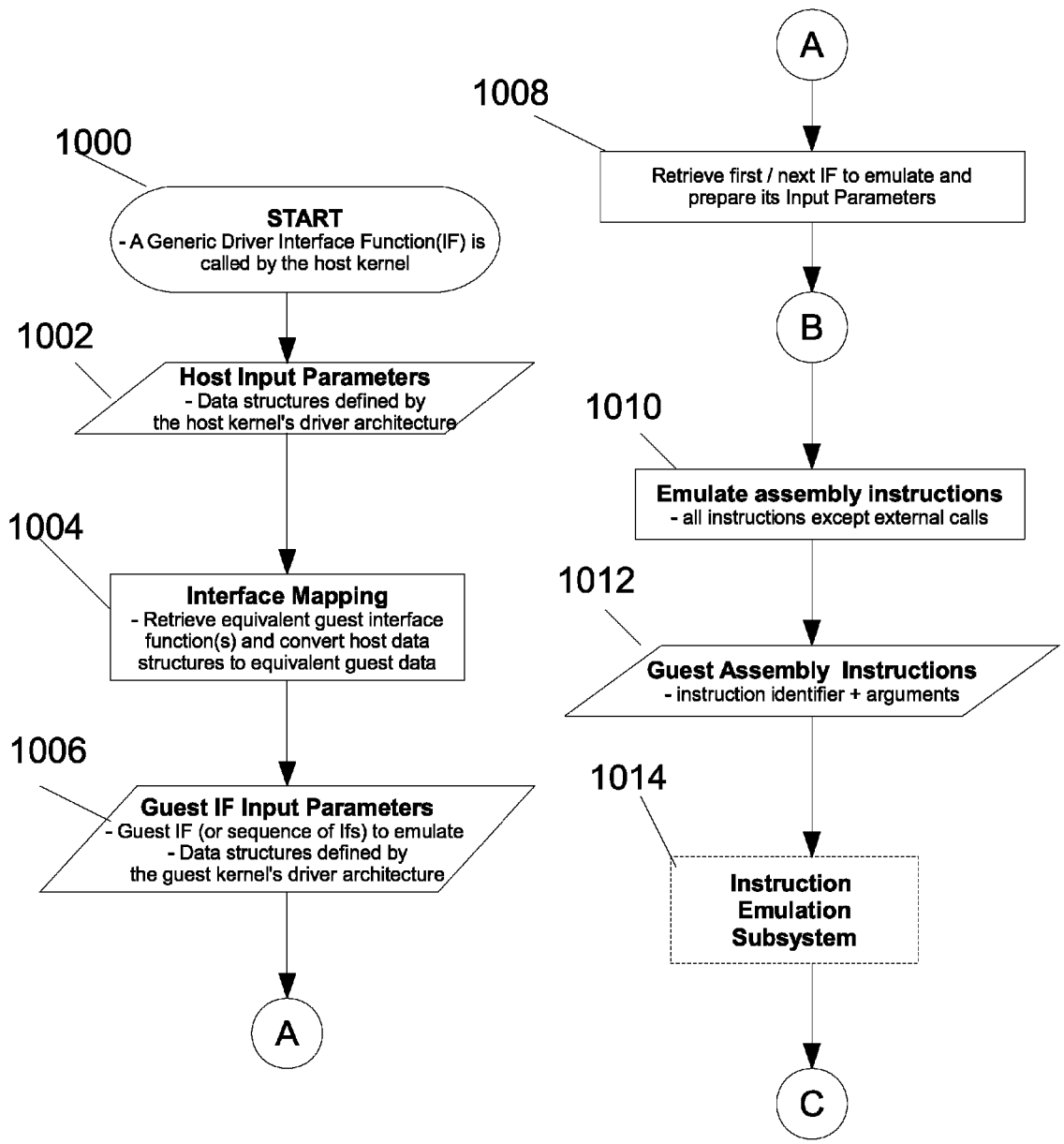
FIGS. 10A-10D are flowcharts of an exemplary embodiment of a driver emulation algorithm.
Figures 10C, 10D:
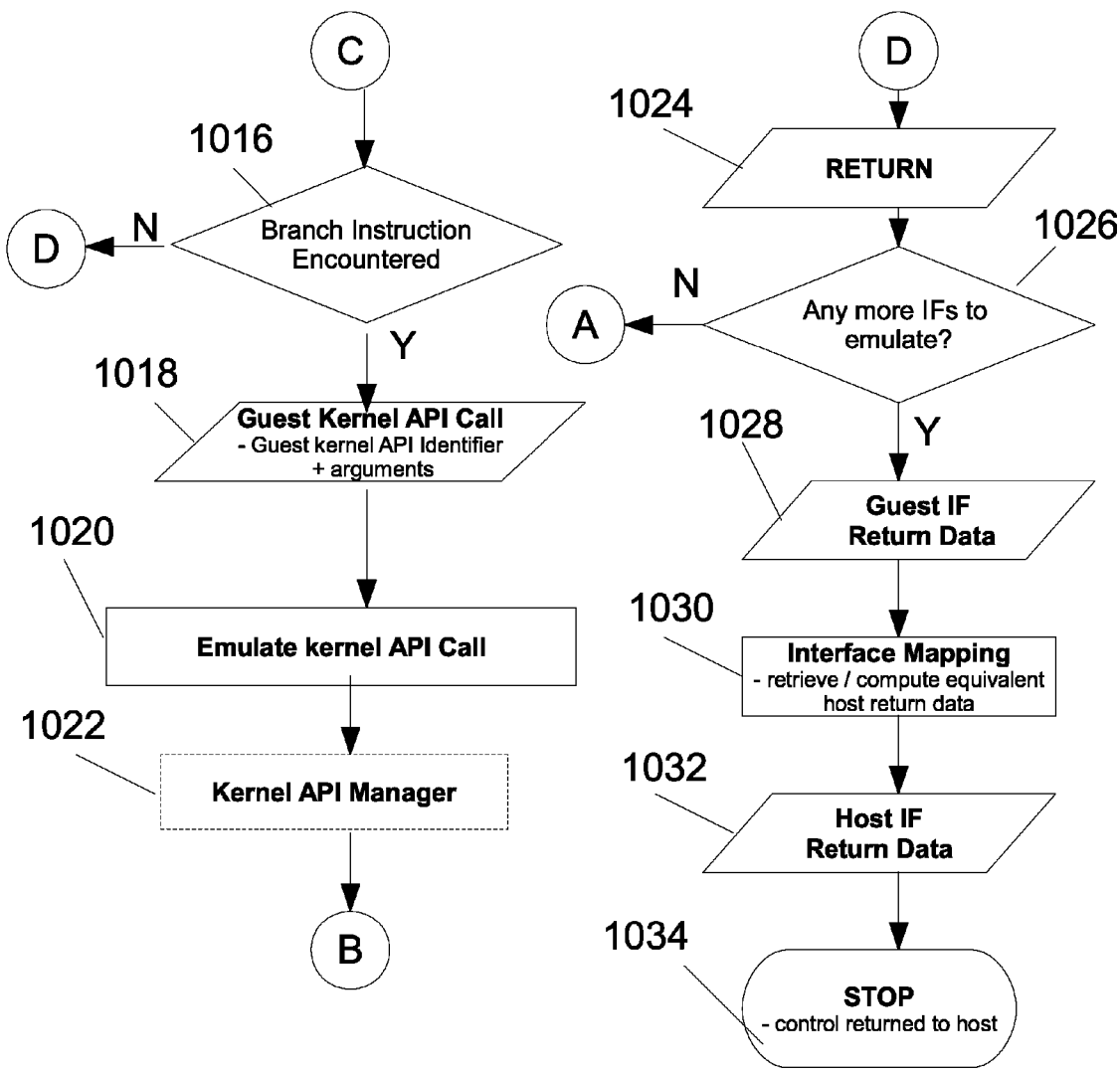

The generic driver (350) also sends out external function calls (450) to the dependency manager (910) (see FIG. 9 for more detail). The generic driver (350) sends processor assembly instructions (470) through the instruction emulation subsystem (480) (see FIG. 6 for more detail).

In FIG. 4 diagram, external host functions (460) refer to the equivalent calls (if available) or emulation (if calls are not available) that perform functionality similar to the external guest functions calls (450). For more information about the relationship of the guest and host functions, see the section on the dependency manager described with regard to FIG. 9.

The device driver guest interfaces (420) are the data structures used by device drivers in the guest operating system (not shown) to represent device and driver states, and for communication with the guest operating system. The device driver guest interface (420) functions as specified by the guest operating driver model. For more information, see the driver model manager (800) described with respect to FIG. 8.

The guest platform (i.e., guest processor and guest operating system), actually becomes a guest only when using virtualization approaches like that according to the present invention. FIGS. 1 and 2 depict the conventional scenario—hence they represent a Windows® x-86 driver when being run conventionally on a Windows® (host operating system) x-86 (host processor) platform. When this driver is used as a guest driver according to the present proposed system, say, to run it on a FreeBSD (the new host operating system according to the described exemplary embodiment) x-64 (the new host processor according to the described exemplary embodiment) platform, Windows® becomes the guest operating system and x-86 becomes the guest processor. This means that from then onwards the inventive system will never be loading or accessing in any way either the guest operating system (Windows®) or the guest processor (x-86). Conventionally, the Windows® x-86 driver communicates with its host operating system (Windows®) and host processor (x-86) using mainly Windows® kernel API calls, and x-86's instruction set, and further, external modules are used that can be loaded within Windows®.

The generic driver host interfaces (430) are the data structures used by device drivers (including the generic driver (350), which is implemented as a device driver) on the host system to represent device and driver states, and to communicate with the host operating system (140). The host device driver interfaces (430) function as specified by the host operating system driver model. For more information, see the section on driver model manager described with respect to FIG. 8.

The guest processor assembly instructions (470) are a sequence of assembly instructions that forms a part of the specified instruction set of the guest processor (not shown) and is contained within the emulated device driver (310).

The host processor assembly instructions (165) are a sequence of assembly instructions that forms a part of the specified instruction set of the host processor (160) that is executed by the generic driver (350) on the host processor (160). In this context, when the host processor is different from the guest processor it refers to the corresponding host instructions that perform a similar functionality to the guest instructions, but on the host. For more information on the relationship between host and guest instructions, see the section on the emulation subsystem described with respect to FIG. 6.

Figure 5:
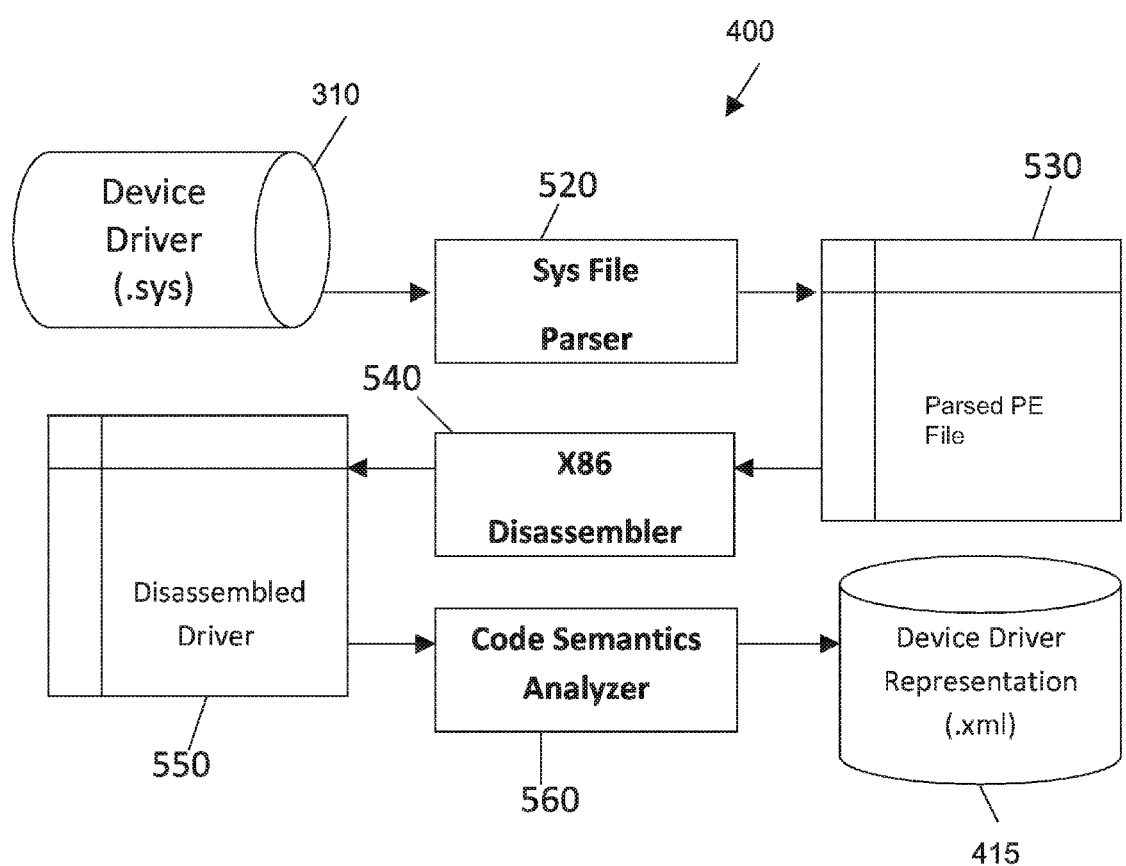
FIG. 5 is a flow-diagram showing the operation of the driver analyzer.

FIG. 5 is a flow-diagram showing an exemplary embodiment of the main components and operation of the driver analyzer (400). The driver analyzer (400) must extract every possible piece of information from the original peripheral device driver binary file (310) to permit the generic driver (350) to make the device (100) work identically as if the emulated device driver (310) itself is controlling the device (100) directly. In Windows®, the device driver files are compiled and stored as a binary .sys file. These are binary files that follow the PE COFF format (PE—Portable Executable, COFF—Common Object File Format), which is a standard fully-specified format. The driver analyzer outputs another file that presents all of the extracted information to the other subsystems in a way that makes it as simple as possible for them to get on with their tasks. Specifically, the device driver (310), compiled as a .sys file, is parsed by the Sys file parser (520) into a parsed portable executable file (parsed sys file 530) to extract all information from the device driver (310). This information, together with the x86 instruction set, is then disassembled by the x86 disassembler (540). The resulting disassembled driver (550) is then passed through the code semantics analyzer (560) to output the device driver representation (415).

The Sys file parser (520) parses the device driver (310) and extracts all information stored within its headers, data directories and tables. The information that is extracted includes details about the software and hardware platform for which it was compiled, the kernel APIs it calls, the functions it calls from external libraries, the functions that the device driver (310) exports for other drivers to call, the resources it uses, base relocation information, and more, the details of which are known to those skilled in the art. In one of the headers, there is also information (pointer and size) about the section within the .sys file itself where the driver's code is stored. However, the content of the driver's code does not fall under the PE COFF specification and hence is not parsed by the Sys file parser (520). The output of the Sys file parser (520) is a parsed PE file (530).

Examples of the format of PE files and tables according to the standard PE COFF specification can be found under: www.microsoft.com/whdc/system/platform/firmware/PE-COFF.mspx.

The X86 disassembler (540) becomes relevant once the device driver (310) sys file has been parsed and stored in the parsed PE file (530). As soon as the sys file parser (520) verifies that the device driver (310) has been compiled for an x86 processor and identifies the base and size of the code section, the x86 disassembler (540) can use this information (taken from the passed PE file (530)) together with the x86 processor's instruction set specification to disassemble the instructions within the code section.

The driver's code section can be seen as a large sequence of various assembly instructions. These assembly instructions all belong to the Instruction Set Architecture—part of which is a specification of a list of instructions together with an algorithm performed by each instruction—of the processor for which the driver was compiled. In the presently described exemplary embodiment, the drivers are mainly those compiled for x-86. Intel's x-86 instruction set architecture is documented within official public documents. They can be downloaded from www.intel.com/products/processor/manuals/. These instructions are encoded within the driver's binary file using opcodes. The disassembler's task is to convert these opcodes into a sequence of instructions as described. Once this is done, all information has been extracted from the driver's binary file (310) and the x86 disassembler (540) outputs a fully disassembled driver file (550). See also the code (1810) shown as an example in FIG. 18.

In this context, the disassembly process involves the translation of binary opcodes into assembly instructions. For example, an x86 disassembler converts a chunk of binary opcodes into their corresponding x86 assembly instructions. This is a standard process, within the skill of a person with an ordinary skill in programming. When a programmer writes a program in any high-level language (such as JAVA, C++, etc.) the program instructions will be automatically converted to assembly language by the compiler (or more specifically, by the assembler). Drivers in Windows® are usually developed using C++, automatically converted to assembly instructions by the compiler (or assembler), and then encoded (again automatically, usually by an interpreter) into the binary coded .sys file.

The driver's code (the assembly code generated by the X86 disassembler (540), which is a sequence of assembly instructions, for example: ADD EAX, EBX; PUSH EAX; PUSH EBX; CALL 0xf0808080) includes a large sequence of instructions that accesses the processor directly, together with branching instructions that transfer control either to the operating system's kernel or to external loaded libraries or drivers. A disassembled driver (550) usually is a very large file. An example of a very small part of it might be:

push ebp
    mov ebp, esp
    sub esp, 4
    mov eax, [ebp+8]
    mul 2
    mov [esp+0], eax
    mov eax, [ebp+12]
    mov edx, [esp+0]
    add eax, edx
    mov esp, ebp
    pop ebp
    ret The code semantics analyzer (560) represents the code in disassembled driver (550) in a manner (such as that shown in FIG. 15) so that it can be accessed later more efficiently by other subsystems. The driver analyzer (400) creates a representation of all of the driver's information in the device driver representation file (415) in xml format. As xml is a "machine-understandable" format, other subsystems can access the xml file and access the information they need directly and efficiently.

Figure 6:
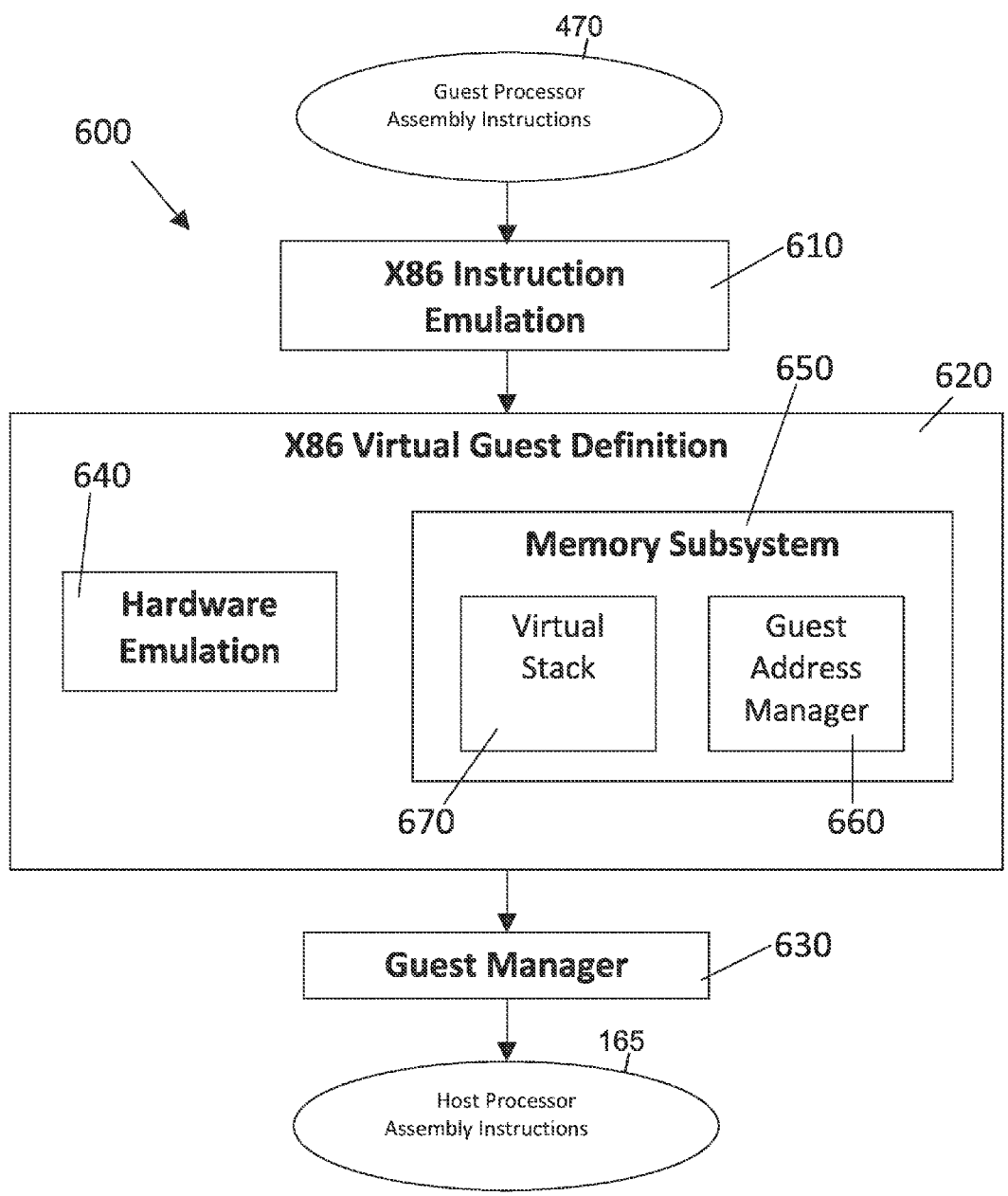
FIG. 6 is a schematic overview of the emulation subsystem.

FIG. 6 is a schematic overview of an exemplary embodiment of the emulation subsystem. As already discussed, the device driver communicates to the host processor directly by means of the opcodes representing assembly instructions stored within the driver's binary file. For example, the opcode representing the assembly instruction "ADD EAX, 0x50" would be 0x0550. This means that any driver compiled for x86 processors—be it any Pentium® processor, AMD 32-bit, etc.—will have its local code represented as a series of opcodes from the x86 instruction set. These instructions would already have been identified and represented by the driver analyzer (400).

As noted above, after analyzing the device driver's contents (which involves a lot of tedious parsing of binary codes stored within the device driver binary file (310)), the driver analyzer (400) creates a representation of the device driver's contents into a format that is much easier to understand and be parsed by other components of the generic driver (350). As part of the process, all complexities related to how the device driver's contents—including tables representing how the driver communicates with other parts of the OS, as well as the x86 instructions—are encoded into the binary (.sys) file on being abstracted from other parts of the generic driver (350) by the driver analyzer. The encoding here will be described in more detail below.

The emulation subsystem (600) takes every instruction in the guest processor assembly instructions (470) and emulates them according to the requirements of the host processor (140), outputting them as host processor assembly instructions (165). However, emulation is not only a process of "translating". Emulation can also happen when the guest instruction set and the host instruction set are identical. Instruction emulation is a standard known process implemented by systems like Bochs and QEMU. When instructions are emulated, they are not allowed to access the hardware architecture directly, but are allowed to access a "virtual" representation of the hardware architecture stored in memory (i.e., the guest processor).

The emulation subsystem (600) functionality can be subdivided into three main areas: 1) x86 virtual guest definition (620); 2) x86 instruction emulation (610); and 3) guest manager (630).

The x86 virtual guest (620) is defined such that instructions from the device driver (310) are not be executed directly on the host processor (140) for two main reasons. First, the host processor (140) may not actually be an x86 processor (refer to Table I above) and treating it as such might cause crashes or other difficulties. Second, it might be unsafe to execute these instructions directly on the host processor (140) as they can either be harmful or can cause the system to become less stable or even crash.

The first task in defining a virtual guest is the hardware emulation (640). This involves defining all of the host processor's hardware—registers and flags, CPU tables and structures—and storing those definitions in the host's memory. Hardware emulation (more specifically "processor emulation") is a standard process used in emulators (such as Bochs and QEMU), and it involves representing all of the hardware components into software. To emulate an x86 processor, the technical architecture specification must be analyzed and all the architectural components must be "modeled" by software programmed to perform the functions of the processor. This is a straightforward process generally known to those of ordinary skill in the art. According to the present invention, a particular methodology to emulate the processor has not been used. Instead the processor components have been modeled in a way that relates as much as possible with the hardware. This emulation of the hardware means that every operation that is usually executed by the device driver (310) on the host processor (140) is now performed on an emulated processor (640) instead.

The second action defines the guest's memory subsystem (650). A sizable number of instructions within the x86 instruction set access the memory (not shown), with the memory address space depending on the amount of memory available on the host processor (140). The basic goal of the memory subsystem (650) is to translate an address that makes sense into the guest context, into an address that makes sense in the host context. There are various possible techniques by which memory is emulated so that the virtual guest has the impression that it has direct access to the physical memory available on the host processor. The described embodiment of the invention uses the simplest possible method for this, by assuming that the guest address is valid on the host context. To allow efficient guest memory management In the future, the protected-mode memory management subsystem available on the x86 processors may need to be extended. However, according to the one embodiment, memory access is controlled by the guest address manager (660), which translates the guest virtual addresses coming from the instructions being emulated—targeted for a conventional host memory subsystem—into controlled host physical addresses. The method of translation used by the solution simply means that the guest address manager (660) treats guest address as host addresses. However, various virtual machine/emulator solutions handle efficient memory management so even if running a lot of guests on one host, the fact that some addresses might clash should not block this solution from running. Finally, a virtual stack (670) is also needed to store all the addresses and parameters that the guest would be pushing on the host stack in a conventional environment.

The virtual stack (670) is identical to the call-stack in the conventional x86 environment. Its purpose is to store "stack frames" (including return addresses, data parameters and return values) so that running processes can execute called functions and return to the respective caller when functions are completed. The generic driver (350) is a process running on the host, and it is in turn emulating "guest processes" (i.e., device drivers) running in the guest environment. The instructions being emulated cannot be allowed to modify the host stack as this would interfere with the process execution control on the host, and would eventually crash the generic driver or other host processes. So, a virtual stack has to be emulated so guest instructions will act on it.

The act of x86 instruction emulation (610) implements the functionality of every instruction within the x86 instruction set, acting on the virtual guest (620) as described above, by modifying the virtual representation of the hardware components. In this way, the emulated instructions do not modify the hardware components. For example, the instruction ADD EAX, EBX should add the value of the EAX register and the value of the EBX register, and store the result in the EAX register. An emulated ADD EAX, EBX will retrieve the values of the virtual EAX and EBX registers stored somewhere in memory, add them and store the result in the memory area that is being used to emulate the EAX register. This is the component of the emulation subsystem (600) that interacts with generic driver (350) by receiving therefrom the guest processor assembly instructions (470).

Whenever x86 assembly instructions contained inside the device driver (310) need to be emulated, the generic driver core (350) determines a sequence of local instructions that need to be emulated and for each instruction it calls emulator functions from the instruction emulation subsystem (480). Each emulator function follows the algorithms provided in the x86 instruction set specification which is know in the art, for example the *Intel IA32 Architecture Software Developers' Manual Volume 2: Instruction Set Reference*, incorporated by reference herein in its entirety. Whenever instructions need to be emulated, the generic driver (350) determines a sequence of local instructions. The local instructions (the greater part of the instructions) are all the instructions that perform actions on any part of the processor architecture directly. The non-local instructions are those (such as CALL) that branch to any other kernel module, driver, operating system subsystem/API and so on, so that the called component can perform the needed actions themselves.

The third component is the guest manager (630), which is in charge of managing the virtual guest's state, presenting information about its state to the generic driver (350) and other subsystems, synchronizing the virtual guest state to the host and vice versa when needed, and other similar tasks. All subsystems within the generic driver (350) interact with the guest manager (630) whenever they need either to obtain any information about the state of the guest, or they need the guest to perform any type of action. In the same manner that the driver analyzer (400) abstracts all complexities related to device drivers' binary files, the guest manager (630) abstracts all complexities related to managing x86 guest "virtual" machines and the respective instruction set. It is also in charge of managing guests running simultaneously, distributing host resources as efficiently as possible among the guests and ensuring that concurrent guests do not disrupt each other while running. This distribution of host resources among multiple guests is a standard task in all virtualization projects, well within the skill of the person ordinary skilled in the art.

In the same manner by which the generic driver (350) calls the emulation subsystem (600) whenever local instructions from the device driver (310) need to be emulated, the generic driver calls the API driver subsystem (700) whenever branches to kernel APIs are encountered (via system calls) and their functionality needs to be accessed. The main difference between the logic behind the emulation and the API subsystems (600, 700) lies in the fact that while the emulation subsystem (600) always emulates every instruction it receives, the API subsystem (700) first checks whether the functionality needed can be obtained directly from the host processor (140). The task of the API Manager (710) is to keep track of the APIs available on the host operating system (140) and, based on the API that needs to be called by the guest OS, to determine which of the other components to call. The following paragraph explains the possible components that can be called (API forwarder (720), mapper (740) or emulator (750)) and the context in which they should each be called.

The best-case scenario occurs when the API referenced by the device driver (310) is available in the host operating system (140). This should be the case when the host operating system (140) is the same (and same version) of the operating system that the driver was compiled for—that is, the guest operating system. That is where the API forwarder (720) comes in. The generic driver (350) accesses the output of the driver analyzer (400) to understand what kernel API needs to be called. The device driver representation (415) output by the driver analyzer (400) is easily understandable by other subsystems because it is written in a standard tagged format.

The emulation subsystem (600) contains a virtual stack (670). Whenever an API is called, the local instructions that precede the actual CALL instruction push data parameters onto the virtual stack (670) that are used by the API in order to compute the needed function. Thus, when forwarding/mapping/emulating an API, the emulation subsystem (600) must be queried first, so it passes on these data parameters. The generic driver (350) accesses the guest manager (630) within the emulation subsystem (600) to obtain the parameters passed on from the virtual stack (670) following the call on the API. When these parameters have been obtained, the generic driver (350) calls the API forwarder (720), which forwards the kernel API call that needs to be made to the host processor (140) and returns the return value to the generic driver (350). This then passes the return value back to the Guest Manager (630) so the Guest Manager, (630) can synchronize the guest processor to enable the guest processor to continue handling the emulation.

There are cases when the host operating system (140) provides APIs that perform the identical functionality of APIs provided by the guest operating system (140), but with some extra functionality included. This can be the case in newer versions of the same operating system, when for example added parameters are used for security reasons (and hence added functionality related to security will be performed by the called function). A similar scenario can happen when the guest and host operating systems are different but contain similar functional subsystems. In both of the above and in similar cases, the host API is called, however some additional functionality must be added before or after to take care of the differences. There could also be cases when the equivalent functionality, normally performed by the guest API, can be performed by a sequence of host APIs. Such cases are handled by the API mapper (740), which assigns a sequence of host APIs to handle the additional functionality.

That functionality that cannot be mapped to host APIs goes to the API emulator (750), which emulates this functionality on the host operating system (140). If complete subsystems need emulation, then the guest OS subsystem emulator (760) is required. To illustrate, assume the guest API X performs Function A on the guest operating system, and assume Function AA is equivalent to the same logical function but performed on the host operating system (140). The host operating system (140) might not have one single API X' that performs Function A. However, it might provide APIs Y and Z that when called in sequence can perform Function AA. The API mapper (740) would understand that API X on the guest processor is called to perform Function A. It understands Function A on the guest processor is equivalent to Function AA on the host processor (160). Hence it calls APIs Y and Z in sequence.

The worst-case scenario in this context would occur when the guest API performs functionality that is impossible to be mapped to host APIs, in which case this functionality would have to be emulated by the API emulator (750) from scratch (or almost) in terms of functions, structures and lower-level kernel APIs available on the host operating system. Sometimes, to achieve this, a whole structural or functional subsystem within the guest operating system would have to be emulated on the host operating system (140). In such cases, the guest operating system subsystem emulator (760) would need to emulate subsystems from the guest operating systems. These subsystems will then be called by the API emulator's functions. The output of the API subsystem (700) is the host operating system kernel API calls (195). It is possible that individual APIs or whole OS subsystems would need to be emulated.

Figure 8:
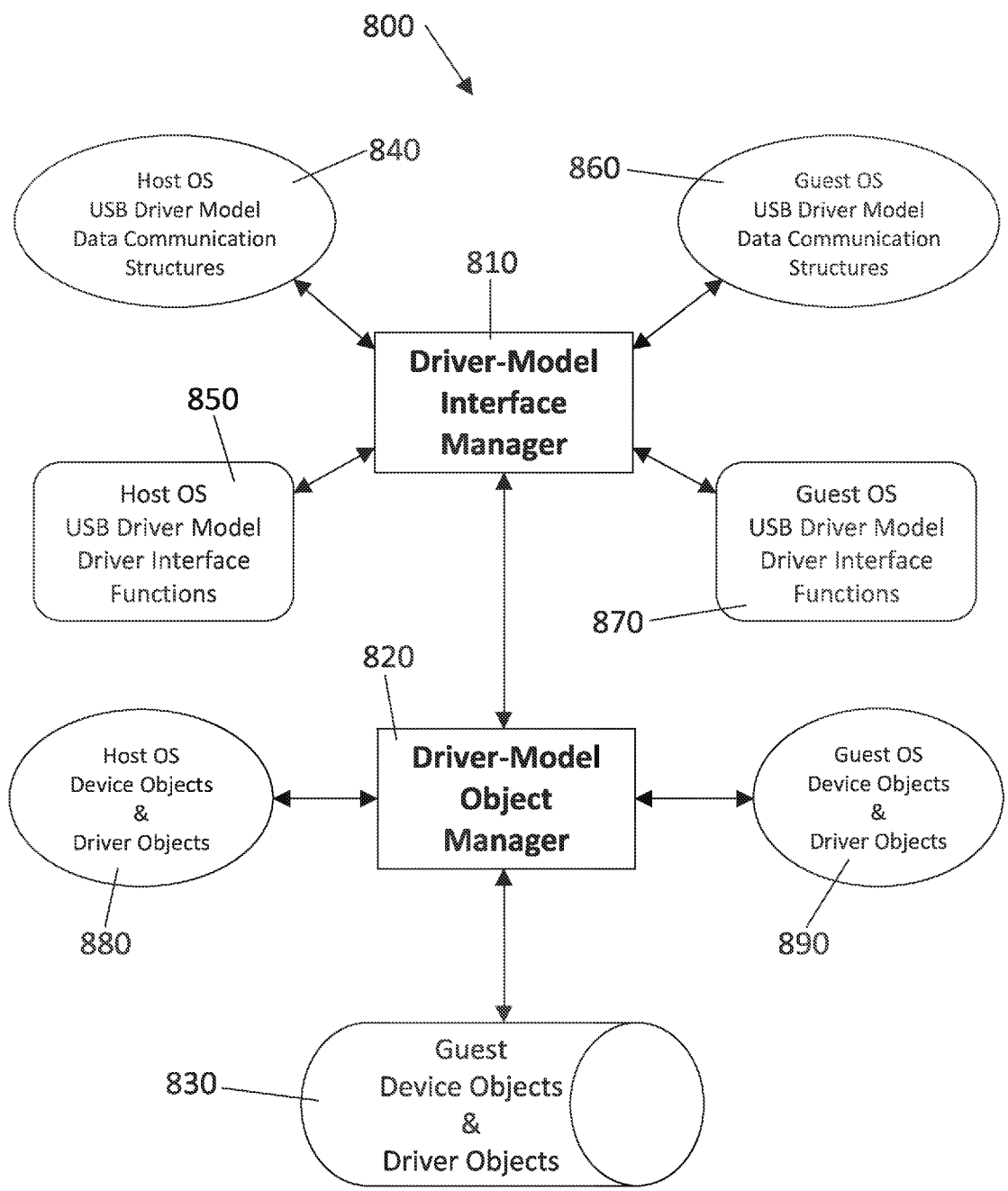
FIG. 8 is a schematic overview of the driver-model manager of the present invention.

FIG. 8 is a schematic overview of an exemplary embodiment (800) of the driver-model manager of the present invention. FIG. 8 shows how the host and guest OS USB driver model data communication structures (840 and 860) and host and guest USB driver model driver interface functions (850 and 870) interact with the driver model interface manager (810), and then how the host and guest OS device objects and driver objects (880 and 890) interface with the driver model object manager (820) which interacts with the guest device objects and driver objects (830).

While the other three subsystems covered so far all deal with data extracted from the device driver's binary file (310), the driver-model manager (800) deals with the device-driver's runtime properties—meaning that the device driver is seen as a kernel-level program that is loaded, unloaded and called by the host operating system (140) in order to perform a particular task. The host operating system (140) can either call the device driver (310) to perform a task initiated by a third entity such as an application or the device itself, or to perform a task initiated by the host operating system. The role of this subsystem is to abstract details about which driver is actually handling the device from the operating system. The purposes of the driver-model manager (800) can be summarized into two main roles: 1) During installation, it must present the generic driver (350) as the driver that is best-ranked to handle the device being installed, should the user want to run the device in emulation mode; and 2) once the generic driver (350) is assigned the role to act as the device driver, the driver-model manager (800) must make sure that control and data transferred to/from the host operating system (140) is exactly identical to the control and data transfers that would occur if the actual device driver was installed.

Let's start with the first role. In conventional systems, an operating system uses the .inf file incorporated within the device driver package as well as some internal structures in order to give a ranking for every device driver in terms of the devices it can handle. When a new device needs to be installed, the operating system can either ask for the user to specify which driver to use, or else it can check for which device drivers are already available. It can then choose the best ranked device driver. Most criteria that determine the ranking relate to the features that directly relate to the device driver, the device itself and the hardware vendor. However, some operating systems, such as Microsoft® Windows®, add other criteria that are related specifically to themselves, such as whether the driver is or is not signed by Microsoft®. Should there not be a device driver that is ranked highly enough to be deemed fit to handle the device, the operating system forces the user to provide a new device driver (from disk or online). Newer operating systems are being distributed packed with pre-installed device drivers that can handle most conventional plug and play devices, making the cases when the user has to specify the driver manually less frequent. The driver-model manager (800) must provide a way to ensure it is highly-enough ranked to be chosen by the operating system to handle the devices that it should be handling. This process varies according to the host operating system on which the generic driver is running. It should also provide an interface for the user to choose whether to install the actual device driver directly—bypassing the generic driver (350)—or whether the device should be run in emulation-mode using the generic driver (350). This process also varies according to the host operating system on the generic driver (350) is running.

The second role of the driver-model manager (800) is somewhat more complex. In Microsoft® Windows®, device drivers contain a number of functions that can be called at any time. These are the dispatch routines—called when a particular event or group of events take place—and other special functions that are called in special circumstances such as when the driver needs to be loaded, when a new device is connected etc. Here the term interface functions as a collective term for these functions that can be called by the operating system is used. When the operating system calls such interface functions, it passes a request package that contains all of the information the driver needs to perform the needed functionality. The operating system then waits for the driver to provide a return value from a predefined set of possible return values specified beforehand.

The problem with this is that different operating systems are based on different architectures and hence have different interfaces and different types of request packages. So in the case when the host operating system is either identical to the guest operating system or, is based on the same driver model (such as different versions or variants of the same operating system), there should not be a problem. However when the guest and host operating systems are based on different driver models, the driver-model interface manager (810) (see FIG. 8) must do the following: 1) identify the functionality for which the host operating system is asking; 2) analyze the information stored within the host operating system's request package; 3) translate the request package to a form that is understood by the device driver, and hence that is compatible with the guest operating system; 4) identify the guest interface function (or combination of guest interface functions) that should contain the same functionality that the host is asking for; and 5) call the generic driver (350) to emulate these guest interface function(s).

The state of a device driver and the device it controls are stored in the form of device and driver objects. DeviceObject and DriverObject are standard windows structures as can be seen at msdn.microsoft.com/en-us/library/ff544174%28v=vs.85%29.aspx and msdn.microsoft.com/en-us/library/dd389207%028v=vs.85%29.aspx.

The task of the driver-model object manager (820) is to handle and maintain the state of these objects during the runtime of all devices that are being handled by the generic driver (350). Again the worst case scenario occurs when the guest and host operating systems are based on diverse driver models, because data will have to be translated directly or indirectly. Even when the guest and host operating systems are identical, the fact that the same driver is used to control various devices causes the one-to-one relationship that normally exists between a driver object and a device object to change. This problem is solved through the use of virtual driver objects, each of which is mapped to the same physical driver object and each of which handles the same device object.

The host operating system device objects and driver objects (880) are the data structures specified by the host operating system driver model in order to represent all of the static and dynamic properties belonging to a device driver (310) and the device (100) it represents. These are standard data structures specified by the USB protocol and listed in the USB specification.

The guest operating system device objects and driver objects (890) are the data structures specified by the guest operating system driver model (800) in order to represent all of the static and dynamic properties belonging to a device driver and the device (100) it represents. Even though the device (100) is identical on both guest and host operating systems, and hence the drivers will have very similar features, the data structures on the guest can have significant differences both in their format as well as in their content from their equivalent on the host operating system.

The guest device objects and driver objects (890) is the repository of guest device and driver representations (415) (as described in the previous descriptions) for every driver that the generic driver is emulating.

Host operating USB driver model data communications structures (840) are data structures used by the host operating system (140) to communicate with a USB device driver (310) whenever the host operating system (140) calls the USB device driver (310) to execute a particular function related to the USB device (100) it controls. Such data includes an indication of what function is needed, information needed for the required function to be performed and information about the current state of the host. The URB structure is one example of the format of this data structure.

The guest operating system USB driver model data communications structures (860) are data structures used by the guest operating system to communicate with a USB device driver (310) when the guest operating system calls the USB device driver (310) to execute a particular function related to the USB device (100) it controls. Such data includes an indication of what function is needed, information needed for the required function to be performed and information about the current state of the guest operating system. Even though data on both guest and host operating system is very similar from a logical point of view, the data structures on the guest operating system can have significant differences both in their format as well as in their content from their equivalent on the host operating system.

The host operating system USB driver model driver interface functions (850) are the functions of the interface that a USB device driver (310) provides for the host operating system (140) to call whenever it needs the USB device driver (310) to perform a certain task. The interface consists of a set of functions, each mapped to one specific event which triggers the host operating system (140) to call the function. The host operating system provides a specific operating system—dependent set of possible events that can be handled by the USB device drivers. For example, assuming that the host operating system is FreeBSD, such events can be "write", "read", "open", "close", "device_attach", "device_suspend", "device_detach".

The guest operating system USB driver model driver interface functions (880) are the functions of the interface that the USB device driver (310) provides for the guest operating system to call whenever it needs the USB device driver (310) to perform a certain task. The interface consists of a set of functions, each mapped to one specific event which triggers the guest operating system to call the function. The guest operating system provides a specific operating system-dependent set of possible events that can be handled by the USB device drivers. This set of events can be different from the set of events provided by the host operating system (140). For example, assuming that the guest operating system is Windows®, such events include all those covered by the standard windows dispatch routines (IRP_MJ_CREATE, IRP_MJ_CLOSE, IRP_MJ_POWER, IRP_MJ_PNP etc), and other standard driver entry points such as Driver_Entry, Unload, and Add_Device.

FIG. 9 is a schematic overview of the dependency manager subsystem (900) according to an exemplary embodiment of the present invention, showing how the external guest function call (450) is input to the dependency manager (910), which consists of the components the dependency forwarder (920) and dependency mapper (930), which output the external guest functions (460), and the dependency emulator (940), which links to the instruction emulation subsystem (950).

More specifically, the dependency manager (910) is called by the generic driver (350) while emulating the device driver (310) whenever the device driver (310) contains branches to external code that are not part of the guest operating system's kernel. In the conventional context, the libraries or drivers containing this code are dynamically loaded by the operating system when the driver is loaded. In the context according to the exemplary embodiment described herein, the driver analyzer (400) would have identified such external files that are used by the device driver (310) and provided information about them in the device driver representation (415) it produces. When such a call is encountered during emulation, the dependency manager (910) is called in the same way as the API would be called when a branch to a kernel API subsystem (700) is encountered. In other words by accessing the device driver representation (415) created by driver analyzer (400), the dependency manager (910) can discover details of the external components (see FIG. 2 . . . the box titled "Other Drivers . . . ") used by the device driver (310).

In fact, the dependency manager (910) can be viewed as being similar to the API subsystem (700), with one fundamental difference. As in the case of the API subsystem (700), the dependency forwarder (920) and the dependency mapper (930) are called by the dependency manager (910) whenever the device driver (310) calls an external function from a dynamically loaded library or from another driver, which is either available on the host operating system or which can be mapped to similar functions available on host libraries/drivers. When these are not available on the host operating system, the dependency emulator (940) has two options. It can re-implement the functionality being called by the guest operating system into a host library or driver and call it directly. Alternatively, the function from the called driver or library can be emulated by the generic driver (350) in the same way as the device driver (310) itself is emulated—by making the driver analyzer (400) create a representation of its contents, emulating its local code through the instruction emulation subsystem (950), and making the API subsystem (700) handle its kernel calls. This process can become recursive should there be further calls to other external libraries/drivers.

FIGS. 10A-10D are flowcharts showing a module for implementing an exemplary embodiment of a driver emulation algorithm that is part of the software for implementing the generic driver. The module starts when the generic driver interface function IF is called by the host kernel (step 1000). Various host input parameters, i.e., data structures, defined by the host kernel's driver architecture (step 1002). The next step (1004) is the interface mapping step, in which equivalent guest interface function(s) are retrieved. Additionally, host data structures are converted to equivalent quest data structures. Next, various guest IF input parameters, or a sequence of Ifs, are defined to be emulated (step 1006). These input parameters are data structures defined by the guest kernel's driver architecture.

At step 1008, the first one of IF parameters is retrieved and the input parameters for that IF parameter is prepared. All assembly instructions except for external calls are then emulated (step 1010). The emulated assembly instructions are output as guest assembly instructions, in the form of an instruction identifier and its arguments (step 1012). The module then enters the instruction emulation subsystem (step 1014).

First, it is determined if the instruction is encountered (step 1016). If it is, then it is determined whether there are any more Ifs to emulate (step 1024, 1026).

If the instruction being emulated is not a branch instruction as determined in step 1016, a call is made to the guest kernel API, using a guest kernel API identifier and arguments (step 1018). The kernel API call is emulated (step 1020) and the kernel API Manager is invoked (step 1022) as shown in the flowchart of FIG. 12 illustrating an exemplary embodiment of the API emulation subsystem. Control then passes back to step 1010, where the next assembly instruction is emulated and the other steps are executed with respect to that next assembly instruction.

If at step 1026 it is determined that there are more IFs to emulate, control returns to step 1008, where the next IF is retrieved and the sequence described above is repeated. If there are no more IFs to emulate at step 1026, the guest IF data is returned (step 1028). Then interface mapping is performed by retrieving and computing the equivalent host return data (step 1030). The host IF data is returned (step 1032) and control is returned to the host (step 1034).

Figure 11A:
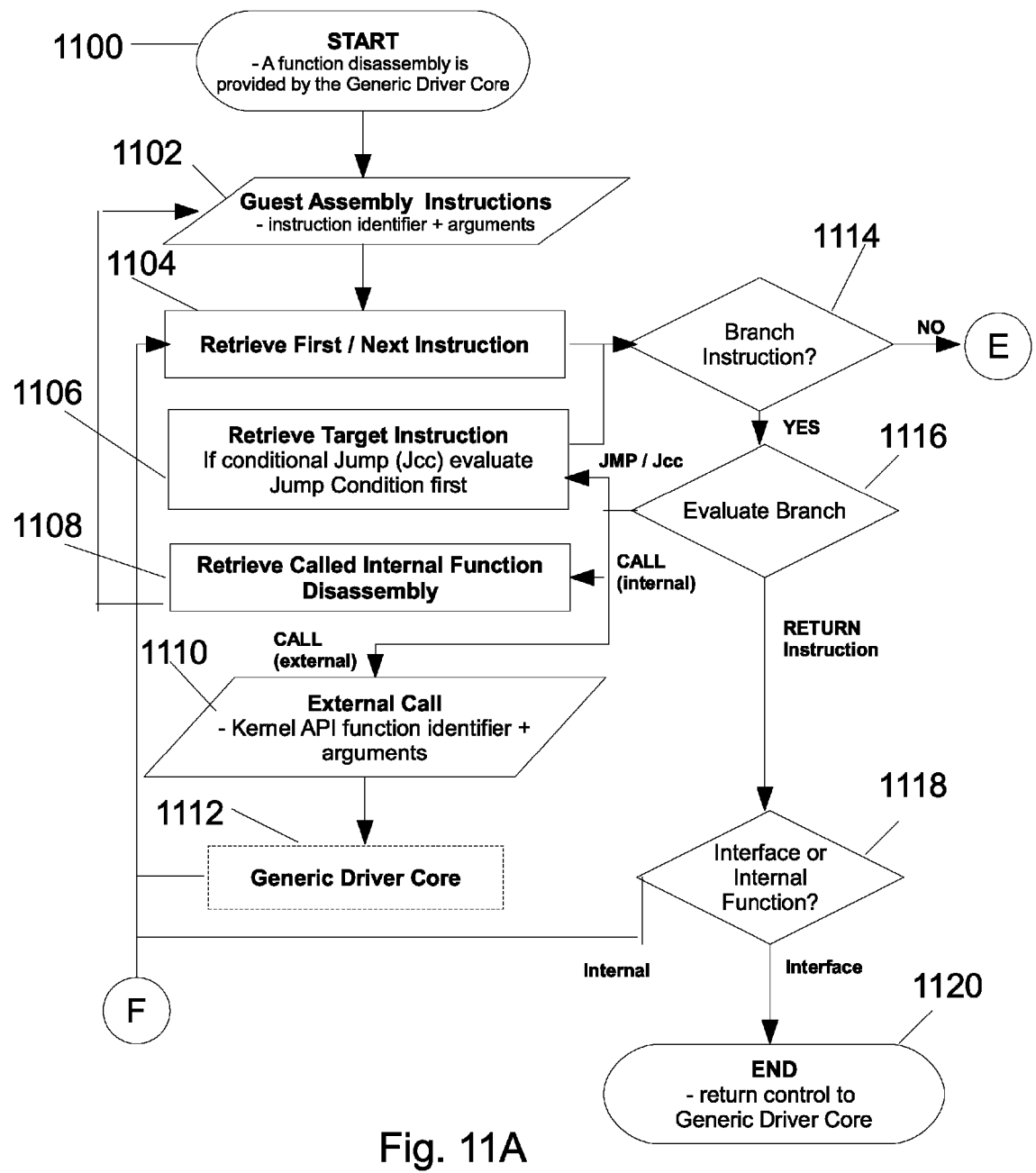
FIGS. 11A-11B are flowcharts of an exemplary embodiment of a instruction emulation algorithm.
Figures 11B, 12B:
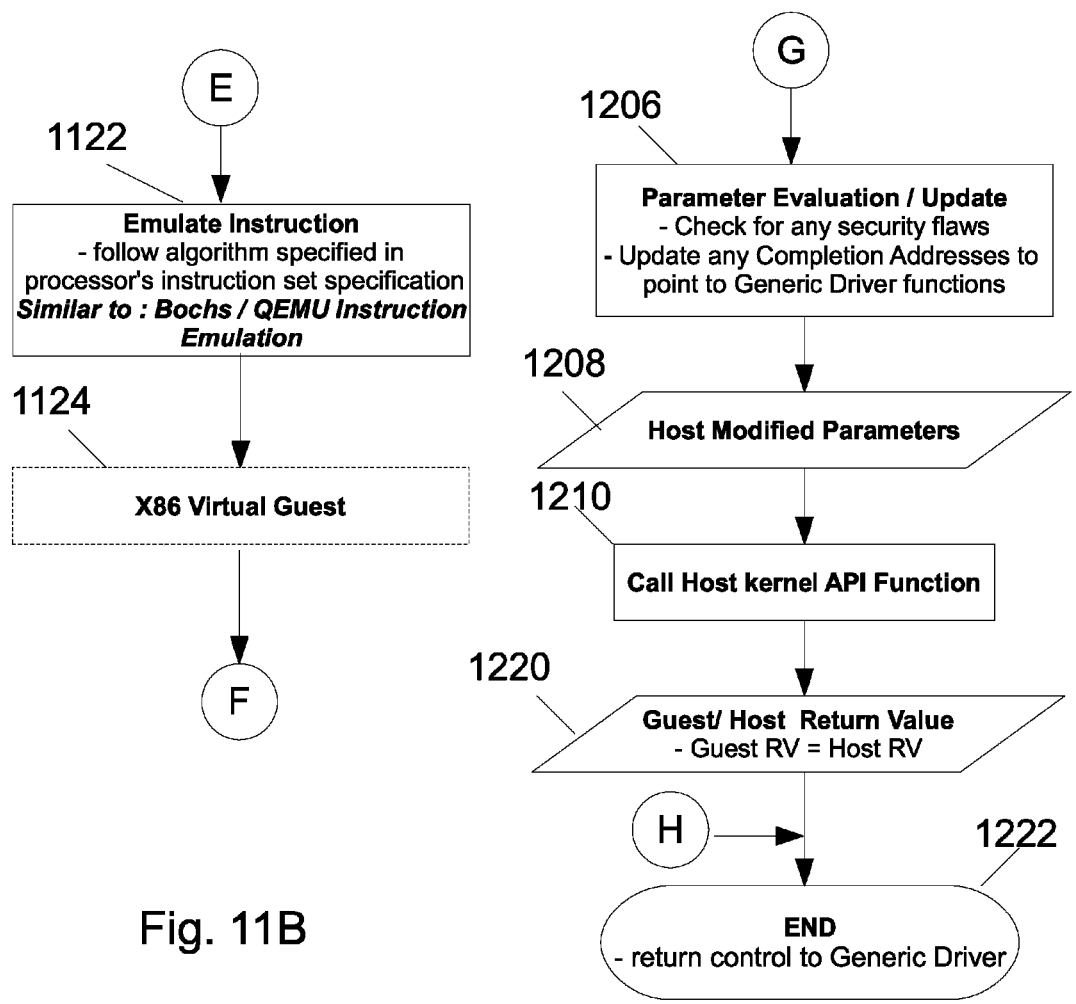
FIGS. 12A-12B are flowcharts of an exemplary embodiment of a API emulation algorithm.

FIGS. 11A-11B are flowcharts showing a module for implementing an exemplary embodiment of a general algorithm for an instruction emulation subsystem that is part of the software for implementing the generic driver. The module starts by a function disassembly (i.e., the disassembly representing all the instructions within the function, as created by the x-86 disassembler) that is provided by the generic driver core (step 1100). Guest assembly instructions in the form of an instruction identifier and arguments are defined (step 1102). At step 1104, the first (or next) instruction is retrieved. If it is determined not to be a branch instruction (step 1114), the instruction is emulated (step 1122). The emulation follows the algorithm specified in the processor's instruction set specification. This is similar to Bochs/QEMU instruction emulation. See bochs.sourceforge.net and wiki.gemu.org/Main_Page. All of the instruction emulation algorithms act on a virtual guest (1124). The program then goes to step 1104 to retrieve the next instruction.

If the retrieved instruction is a branch instruction (step 1114), the branch is evaluated at step 1116. If it is a jump instruction or a conditional jump (Jcc) instruction, the target instruction is retrieved (step 1106). If it is a conditional jump (Jcc) instruction, the jump condition is evaluated first. If the branch instruction at step 1116 is an internal function call instruction, the called internal function disassembly is retrieved (step 1108) and control returns to step 1102. If the branch instruction at step 1116 is an external function call, the external call is defined by a kernel API function identifier and arguments (step 1110). Then, the generic driver core (350) is called (step 1112) to inform it that a kernel API has been called so it takes the necessary action before instruction emulation is resumed, and then control returns to step 1104 to retrieve the next instruction.

If at step 1116, the branch instruction is a return instruction, it is determined whether it is a return to an interface or an internal function (step 1118). If it is an internal function, control returns to step 1104 to retrieve the next instruction. If it is an interface return, control returns to the generic driver core (350) (step 1120) to inform the generic driver core that the requested action (to emulate a particular function) has been completed.

Figure 12A:
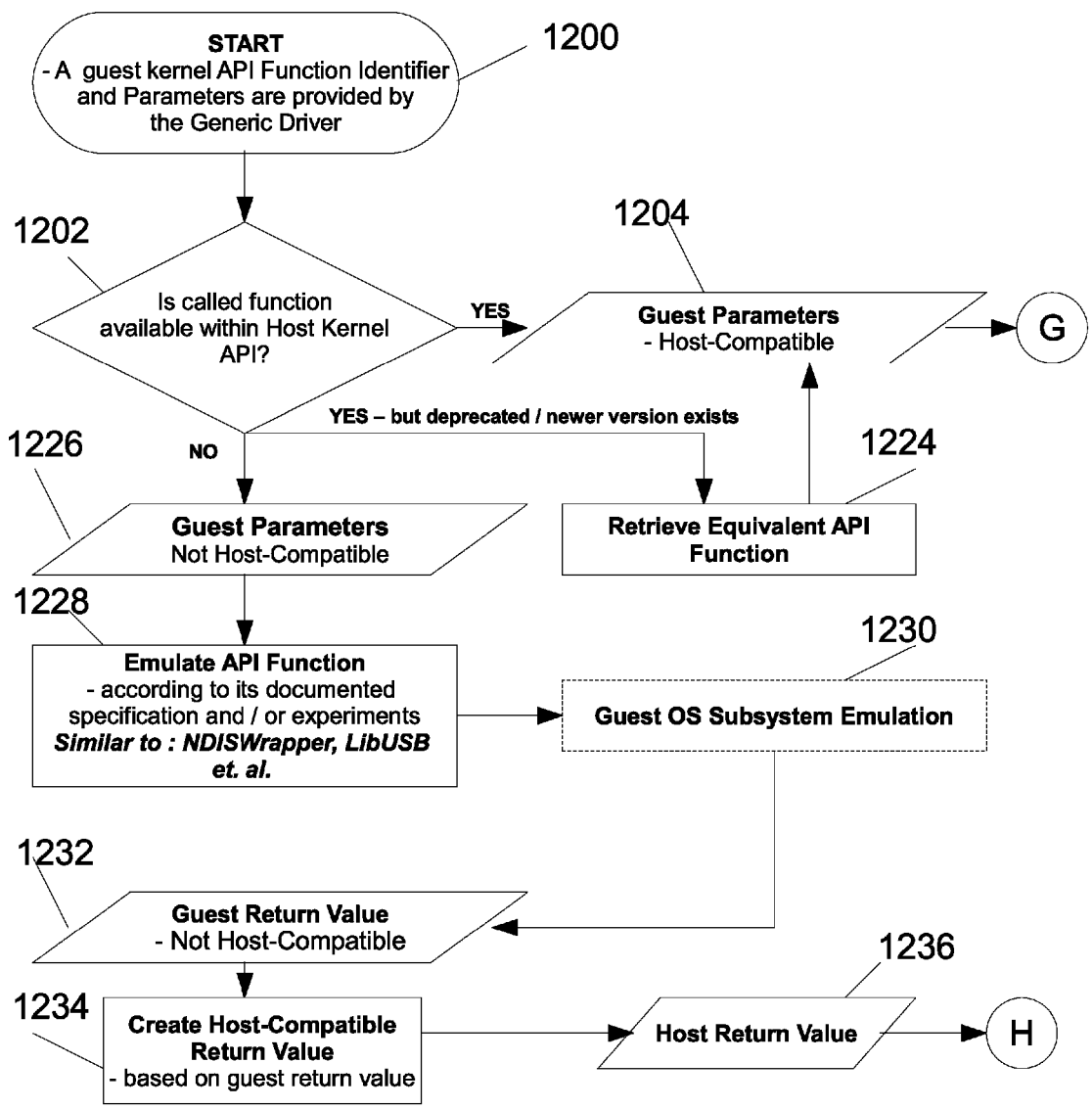

FIGS. 12A-12B are flowcharts showing a module for implementing an exemplary embodiment of a general algorithm for an API emulation subsystem that is part of the software for implementing the generic driver. At the start of the module, a guest kernel API function identifier and associated parameters are provided by the generic driver (step 1200). At step 1202, it is determined whether the called function is available within the host kernel API.

If the called function is available, host compatible guest parameters are defined (step 1204). if the called function is available, but a deprecated or new version exists, the equivalent API function is retrieved at step 1224. Then the host compatible guest parameters are defined in step 1204. After defining the host compatible guest parameter in step 1204, a parameter evaluation and update is performed (step 1206). During this process, the program checks for any security flaws and updates any completion addresses to point to the generic driver functions. Host modified parameters are defined (step 1208) and the host kernel API function is called (step 1210). The guest return value, equal to the host return value is determined (step 1220) and control is then returned to the generic driver core (350) (step 1222).

If the called function is available in a deprecated or newer version (step 1202), the equivalent API function is obtained and control passes to step 1204. If the function is not available, guest parameters that are not host compatible are defined (step 1226). The API function is then emulated (step 1228). This emulation is done according to the API function's documented specification and/or source code. This is similar to NDISWrapper, LibUSB and other similar programs. The guest operating system subsystem is then emulated (step 1230). The guest return value (not host compatible) is then determined (step 1232). A host compatible return value is created based on the guest return value (step 1234). The host compatible return value is returned (step 1236) and control is then returned to the generic driver (step 1222).

The present invention can be configured to work in a network environment that includes a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino® processors, which are configured to communicate with the computer. Any number and type of machines may be in communication with the computer.

Figure 13:
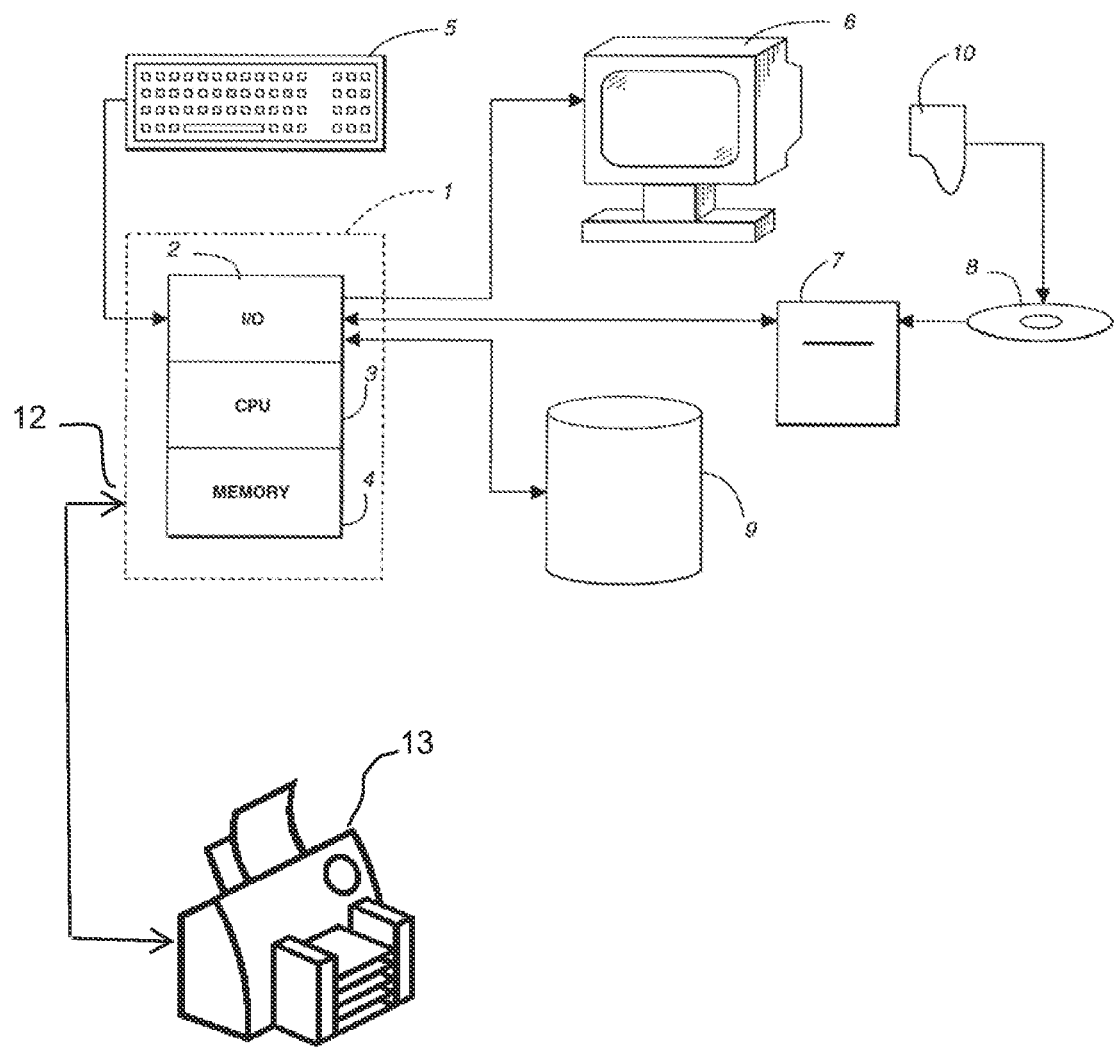
FIG. 13 illustrates a computing system for performing the computer implemented steps of the method in accordance with the invention.

FIG. 13 illustrates a computing system for performing the computer implemented steps of the method in accordance with the invention. The operating environment in which the present invention is used encompasses the general distributed computing system, wherein general purpose computers, workstations, or personal computers (hereinafter local nodes) are connected via communication links of various types, in a client-server arrangement, wherein programs and data, many in the form of objects, are made available by various members of the system. Some of the elements of a general purpose workstation computer are shown in FIG. 1, wherein a processor (1) is shown, the processor having an input/output (I/O) section, a central processing unit (CPU 3) and a memory section (4). The I/O section (2) is connected to a keyboard (5), a display unit (6), a disk storage unit (9) and a CD-ROM drive unit (7). The CD-ROM unit (7) can read a CD-ROM medium (8) which typically contains programs (10) and data. Also included is a printer (13) connected to the computer through a USP port (12). Other peripherals may be connected as well through any number of USB ports supportable by the computer system being used. The computer program products containing mechanisms to effectuate the apparatus and methods of the present invention may reside in the memory section (4), or on a disk storage unit (9), or on the CD-ROM (8) of such a system. Examples of such systems include SPARC systems offered by Sun Microsystems, Inc., personal computers offered by IBM Corporation and by other manufacturers of IBM-compatible personal computers, and systems running the UNIX or LINUX operating systems.

Figure 14:
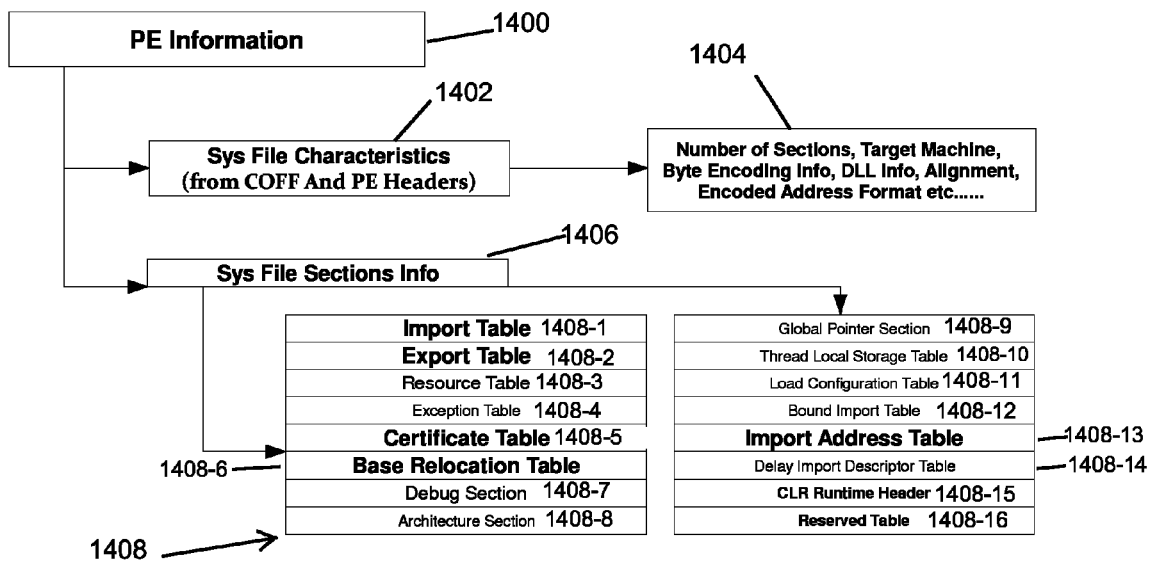
FIG. 14 illustrates an exemplary embodiment of an overview of a PE-COFF file contents.
Figure 15:
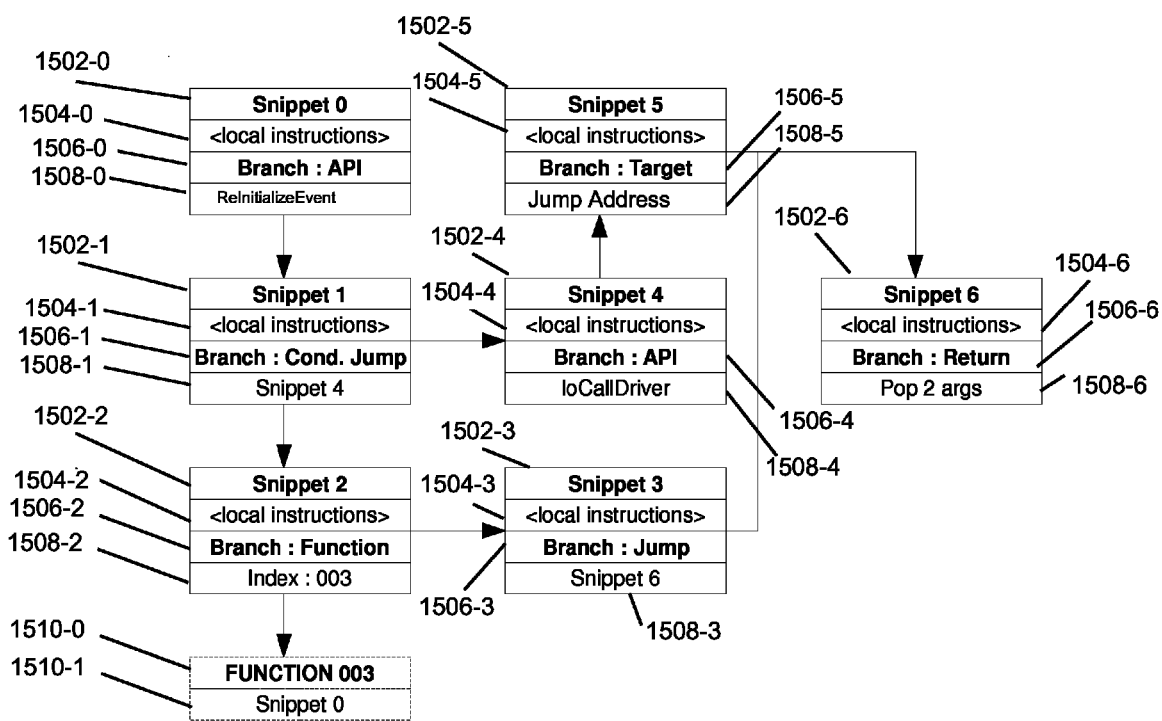
FIG. 15 illustrates an exemplary embodiment of a x86 code disassembler.
Figure 16:
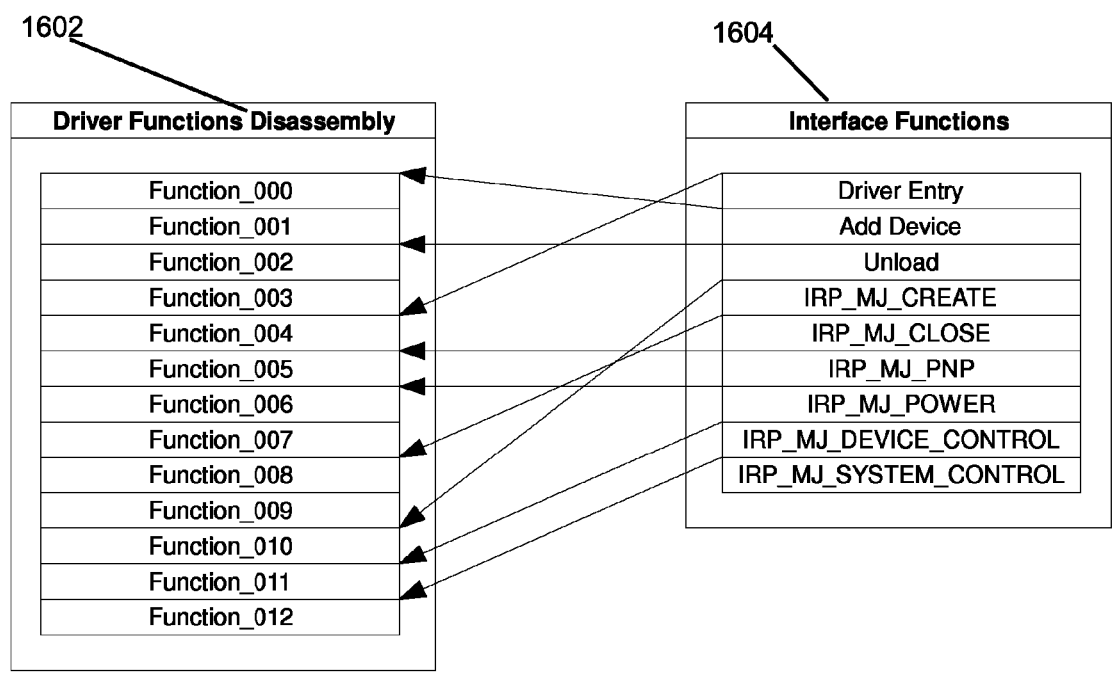
FIG. 16. illustrates an exemplary embodiment of a function modeled by the code semantics analyzer.
Figure 17:
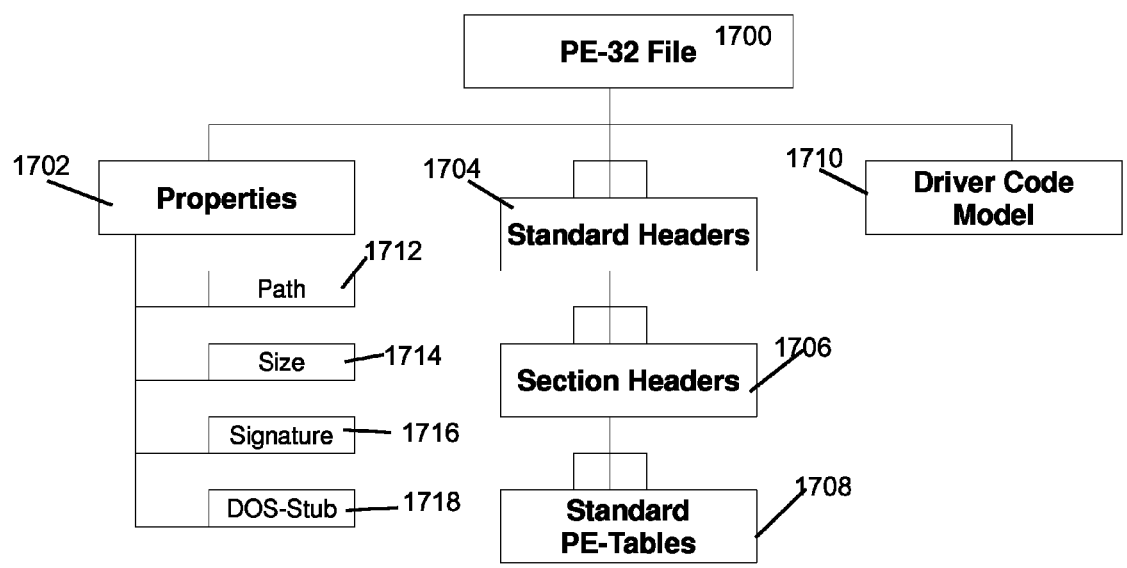
FIG. 17 illustrates an exemplary embodiment of interface functions detected by the code semantics analyzer.

FIGS. 14-16 provide an illustration of an exemplary embodiment of the driver analyzer (500) of FIG. 5. Specifically, FIG. 14 illustrates an exemplary embodiment of an overview of a PE-COFF file contents, FIG. 15 illustrates an exemplary embodiment of a x86 code disassembler (540), FIG. 16. illustrates an exemplary embodiment of functions modeled by the code semantics analyzer (560), and FIG. 17 illustrates an exemplary embodiment of interface functions detected by the code semantics analyzer (560).

In order to implement the Sys File Parser (520), Microsoft's PE-COFF-32 specification was used as a guideline in a test implementation of the invention. This specification is available from Microsoft® at msdn.microsoft.com/en-us/windows/hardware/gg463119. PE-COFF is an acronym for Portable Executable (PE) and Common Object File Format (COFF) files, respectively. The specification describes the structure of executable (image) files and object files under the WINDOWS® family of operating systems. As with other embodiments described herein, this is provided by way of example only, and is not intended to be the only way of implementing the functions described herein. Other ways are possible, within the skill of the ordinary artisan.

The extraction of static data by the PE-32 parser (520) and the X86 disassembler (540) will now be described (see FIGS. 14 and 18). Both are standard processes, and were re-written according to an exemplary embodiment of the invention to store the output in xml format. In order to implement the PE-32 parser, Microsoft's PE-COFF-32 specification was used as a guideline.

When parsing a driver's compiled 'sys' file (1802), once all headers section are parsed, one has an idea of which PE tables are present within the driver (PE information 1400). At least one section will always be the code section (1808), and other section such as the init section can also contain code. The presence of code within sections (1402) is determined through section characteristics flags within the section headers (1404). Other sections will contain standard PE tables (sys file sections information 1406). As shown in FIG. 14, as many as 16 such tables (1408) can be present.

However, after testing the headers of the two main test drivers as well as all the sys files currently within the test machine's drivers folder during the test implementation, it was found that typical drivers only contain the tables that are highlighted with larger text in the figure (import table 1408-1, export table 1408-2, certificate table 1408-5, base relocation table 1408-6, and import address table 1408-13). The format and specifications for those tables are known in the art. A number of drivers contained a certificate table (1408-5), a resources table (1408-3) and a debug section (1408-7). Other tables included an exception table (1408-4), an architecture section (1408-8), a global pointer section (1408-9), a thread local storage table (1408-10), a load configuration table (1408-11), a bound import table (1408-12), a delay import descriptor table (1408-14), a CLR runtime header (1408-15), and a reserved table (1408-16). Basic handling was implemented within the parser (520) but not all detail was extracted since it is not needed for an understanding of the present invention.

One note about the base relocation table (1408-6): although the guest device driver (310) will never be loaded on the host operating system (140) using the described approach, this section is very important to obtain the addresses of important place-holders, such as any virtual addresses stored within the driver's code branch instructions.

Figure 18:
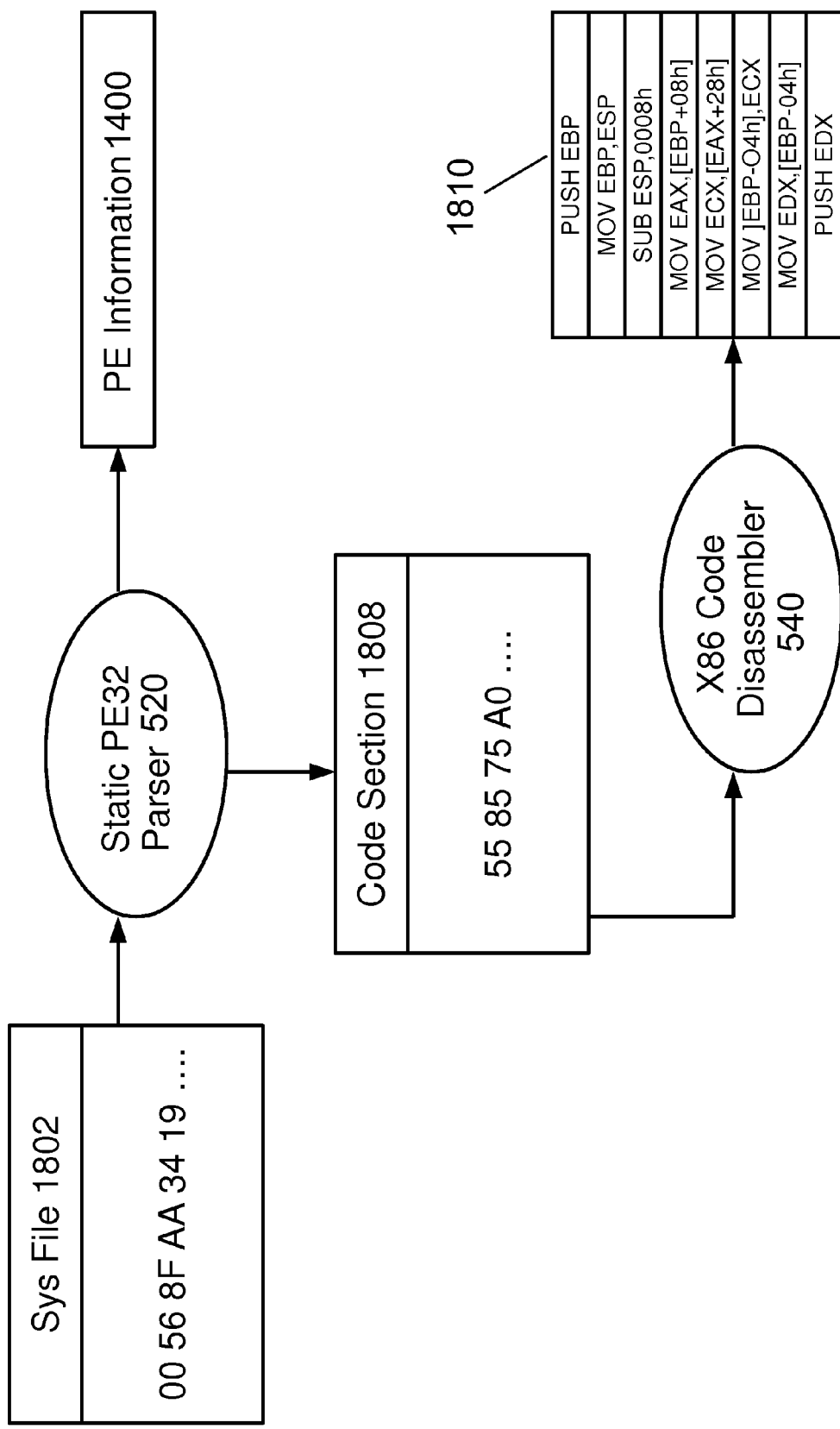
FIG. 18 illustrates an exemplary embodiment of extraction and parsing of code within a .sys file.

Once all relevant PE information has been extracted in to the parsed PE file (530), the x86 disassembler (540) is called as shown in FIG. 18. It goes through the code section (1808), starting from the Driver Entry—which is part of the PE Information (1400)—using the algorithm described in the above description. By the end of this process, all relevant static information would have been extracted from the device driver (310).

To model the driver's code and interfaces, through the static analysis tools just described, 2 out of the 3 elements of platform interface information that one needs to implement the invention are already in hand. These are: 1) the processor instructions used by the driver (disassembled driver 550)—obtained through the X86 code disassembler (540); and 2) the kernel API functions called by the driver—obtained through the PE information (1400) in the parsed PE file (530). The final needed element is the driver's primary entry points, i.e., interface functions. These are a must, when later on the GDI receives calls—on behalf of the guest driver—from the kernel, it will know which functions it should interpret. Such information cannot be obtained 100% statically, and is obtained by emulating the Driver_Entry function. It is standard in WDM drivers that within the Driver_Entry function, the Driver Object structure is filled up with the virtual addresses of the driver's Primary Entry Points—the Add_Device, Unload and any Dispatch Routines. FIG. 16 gives an overview of the state of the guest driver representation after its primary interface function are identified.

Finally, the internal disassembled code within each function is modeled in terms of local code snippets through the code semantics analyzer (560). FIG. 15 gives an example of how a function is represented within the described exemplary model. As it can be seen from FIG. 15, every snippet (1502-0, 1502-6) contains a sequence of local instructions (1504-0, 1504-6), and a branch representation (1506-0, 1506-6). A local instruction is any x86 non-branching assembly instruction. There at least 5 standard branch instructions—application program interface (1506-0, 1506-4) (API), function call (1506-2) (CALL), unconditional jump (1506-3) (JMP), conditional jump (1506-1) (Jxx), and return to caller (1506-6) (RETURN)—or a branch Target (1506-5), meaning that it refers to an address (1508-5) that can be branched to by a JMP or Jxx instruction. This had to be added for simplifying the implementation so that every jump branch points to the start of a snippet. The Return branch representation contains data about arguments (1508-6) that need to be popped from the stack on return. For the API branch instructions, the target (1508-0, 1508-4) is the program interface to which control is to be transferred. For the conditional jump (1506-1) instruction, the target (1508-1) is the individual snippet to which control is to be transferred if the condition is satisfied, and for the unconditional jump (1506-3), the target (1508-3) is also the snippet to which control is to be passed. The function call branch (1506-2), having index (003) as its argument, calls function 003 (1510-0), with snippet 0 (1510-1) as its argument. FIG. 16 illustrates an exemplary embodiment of interfaces functions (1604) that are modeled in the driver functions disassembly (1602).

At this stage all the relevant driver contents and properties are modeled. What is left now is to store all this information in a platform-independent and machine-understandable format. Standard XML was the natural choice for the following reasons: 1.) nested XML tags are ideal to store structural hierarchical data; 2) since strictly plain XML is being used—no schemas, parameters within tags etc.—storing and accessing such data can be definitely done on any platform using a miserly amount of resources; and 3) the learning effort for the notation we are using is almost none, and hence making it very easy for future improvements and additional plug-in tools to be implemented by third parties.

FIG. 17 (described above) shows a very high level structural overview of the xml file PE-32 file (1700). The properties (1702), headers (1704, 1706) and tables (1708) nodes are all part of the PE Information extracted by the sys file parser (520) while the driver code model (1710) is demonstrated by the example in FIG. 15. The properties include such information as the path (1712), the size (1714), the signature (1716) and the DOS-Stub (1718).

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software, except as otherwise explicitly stated.

A "processor" means any one or more microprocessors, central processing units (CPUs), computing devices, microcontrollers, digital signal processors, or like devices.

The term "computer-readable medium" refers to any non-transitory medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, any other memory chip or cartridge, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Although various features of the invention have been described with particular embodiments. It is considered within one of ordinary skill in the art to mix and match the features in other embodiments not depicted in the figures.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A method for controlling a peripheral hardware device connected to a computer system, said computer system comprising a first operating system, acting as the host operating system, running on a first processor platform, and a generic device driver configured to operate on the combination of said first operating system and first processor platform, said method comprising:

delivering said peripheral hardware device with an original peripheral hardware device driver file written for at least one of a second operating system and a second processor platform, installing the generic driver to handle all interfaces between the first operating system, the peripheral hardware device, and any software applications, all of which are configured to interact with the original peripheral device driver, extracting input to said generic device driver from said original peripheral device driver to provide the generic device driver with information about how to handle features and functionality of peripheral hardware device to allow the peripheral hardware device to work in the first operating system and on the first processor platform in a same way that the original peripheral hardware device would work in the second operating system and processor platform, the information about how to handle features and functionality including all application programming interface (API) calls, and information about how to emulate only those parts of the second operating system and the second processor platform that are required for the original peripheral device to operate on the first operating system and the first processor platform, the step of extracting comprising the steps of:

parsing said original peripheral device driver file and writing logic determined by said parsing into a parsed portable executable file;

disassembling a code section within said original peripheral device driver file using information taken from the parsed portable executable file and a disassembler appropriate to the combination of said second operating system and said second processor platform for which said original peripheral device driver was written to output a disassembled driver file; and creating a device driver representation file comprising a representation of all information in the disassembled driver file in a format that is readable by, and can be interpreted by said generic device driver and that is different than the format of the information in the disassembled driver file, said information in the disassembled driver file including all assembly instructions in a portable executable file associated with the original peripheral device driver file, handling, by said generic device driver, using the device driver representation file, interfaces between the first operating system, the peripheral hardware device and at least one software application, all of which are configured to interact with said original peripheral device driver file, emulating, by said generic device driver, at least a part of said second operating system and said second processor that are required for the peripheral hardware device to operate on said first operating system and said first processor, and causing the first operating system to communicate with the generic device driver to control the peripheral hardware device via system calls, kernel application programming interface calls and the device driver representation file, wherein said step of causing comprises presenting said generic device driver to said first operating system running in kernel mode as being a device driver best suited for a particular hardware device, in place of said original peripheral hardware device driver.

2. The method according to claim 1, further comprising examining, by said generic device driver, functionality of said original peripheral device driver as to security and stability issues for interaction on said first operating system and processor platform.

3. The method according to claim 1, wherein the information extracted from the original peripheral device driver includes instructions, and the method further comprises emulating all instructions that are extracted from said original peripheral device driver that need to be emulated using a driver analyzer and passing the extracted instructions to instruction emulation functions in a virtualized guest system to emulate the determined sequence of instructions.

4. The method according to claim 1, passing the extracted APIs to API Forwarder/Mapper/Emulation functions in the host system to emulate the extracted APIs.

5. The method according to claim 1, wherein said computer system has at least one universal serial bus port (USB port) for use in the input and output of data, and wherein the said peripheral hardware device is connected to the computer system by means of the USB port.

6. The method according to claim 1, wherein the combination of the said second operating system and second processor platform is the same as the combination of said first operating system and first processor platform.

7. A non-transitory computer readable medium storing a computer program capable of being executed by a computer processor, the computer program for controlling a peripheral hardware device connected to a computer system, said computer system comprising a first operating system, acting as the host operating system, running on a first processor platform, and a generic device driver configured to operate on the combination of said first operating system and first processor platform, and comprising instructions for performing the following steps:

delivering said peripheral hardware device with an original peripheral hardware device driver file written for at least one of a second operating system and a second processor platform, installing the generic driver to handle all interfaces between the first operating system, the peripheral hardware device, and any software applications, all of which are configured to interact with the original peripheral device driver, extracting input to said generic device driver from said original peripheral device driver to provide the generic device driver with information about how to handle features and functionality of the peripheral hardware device to allow the peripheral hardware device to work in the first operating system and on the first processor platform in a same way that the original peripheral hardware device would work in the second operating system and processor platform, the information about how to handle features and functionality including all application programming interface (API) calls, and information about how to emulate only those parts of the second operating system and the second processor platform that are required for the original peripheral device to operate on the first operating system and the first processor platform, the step of extracting comprising the steps of:

parsing said original peripheral device driver file and writing logic determined by said parsing into a parsed portable executable file;

disassembling a code section within said original peripheral device driver file using information taken from the parsed portable executable file and a disassembler appropriate to the combination of said second operating system and said second processor platform for which said original peripheral device driver was written to output a disassembled driver file; and creating a device driver representation file comprising a representation of all information in the disassembled driver file in a format that is readable by, and can be interpreted by said generic device driver and that is different than the format of the information in the disassembled driver file, said information in the disassembled driver file including all assembly instructions in a portable executable file associated with the original peripheral device driver file, handling, by said generic device driver, using the device driver representation file, interfaces between the first operating system, the peripheral hardware device and at least one software application, all of which are configured to interact with said original peripheral device driver file, emulating, by said generic device driver, at least a part of said second operating system and said second processor that are required for the peripheral hardware device to operate on the said first operating system and said first processor, causing the first operating system to communicate with the generic device driver to control the peripheral hardware device via system calls, kernel application programming interface calls and the device driver representation file, and presenting said generic device driver to said first operating system running in kernel mode as being a device driver best suited for a particular hardware device, in place of said original peripheral hardware device driver.

8. The computer program according to claim 7, further comprising instructions for examining, by said generic device driver, functionality of said original peripheral device driver as to security and stability issues for interaction on said first operating system and processor platform.

9. The computer program according to claim 7, said step of causing comprises instructions, which when executed on the computer processor, emulate all instructions that are extracted from said original peripheral device driver that need to be emulated and call instruction emulation functions in a virtualized guest system to emulate the determined sequence of instructions.

10. A computer system comprising:
a peripheral hardware device;
a first computer processor having an input connected to the peripheral hardware device,
a memory storing a first operating system, acting as the host operating system, running on the first processor, and a generic device driver file configured to operate on the combination of said first operating system and the first processor,
an original peripheral hardware device driver file stored on said memory for controlling said peripheral hardware device written for at least one of a second operating system and a second processor,
wherein said generic device driver file controls interfaces between the first operating system, the peripheral hardware device and at least one software application, all of which are configured to interact with said original peripheral device driver file,
wherein said generic device driver file contains computer instruction code configured to:
emulate only a part of said second operating system and said second processor that are required for the peripheral hardware device to operate on the said first operating system and said first processor,
handle all interfaces between the first operating system, the peripheral hardware device, and any software applications, all of which are configured to interact with the original peripheral device driver, extracting input to said generic device driver from said original peripheral device driver to provide the generic device driver with information about how to handle features and functionality of the peripheral hardware device to allow the peripheral hardware device to work in the first operating system and on the first processor platform in a same way that the original peripheral hardware device would work in the second operating system and processor platform, the information about how to handle features and functionality including all application programming interface (API) calls, and information about how to emulate parts of the second operating system and the second processor platform that are required for the original peripheral device to operate on the first operating system and the first processor platform, by parsing said original peripheral device driver file and writing logic determined by said parsing into a parsed portable executable file;

disassembling a code section within said original peripheral device driver file using information taken from the parsed portable executable file and a disassembler appropriate to the combination of said second operating system and said second processor platform for which said original peripheral device driver was written to output a disassembled driver file; and creating a device driver representation file comprising a representation of all information in the disassembled driver file in a format that is readable by, and can be interpreted by said generic device driver and that is different than the format of the information in the disassembled driver file, said information in the disassembled driver file including all assembly instructions in a portable executable file associated with the original peripheral device driver file; and causing the first operating system to communicate with the generic device driver to control the peripheral hardware device via system calls, kernel application programming interface calls and the device driver representation file, wherein said step of causing comprises instructions, which when executed on the computer processor, present said generic device driver file to said first operating system running in kernel mode as being a device driver best suited for a particular hardware device, in place of said original peripheral hardware device driver file.

11. The computer system according to claim 10, wherein said instruction code is configured to examine, by said generic device driver file, functionality of said original peripheral device driver file as to security and stability issues for interaction on said first operating system and the first processor.

12. The computer system according to claim 10, wherein the information extracted from the original peripheral device driver includes instructions, and wherein said instruction code is configured to emulate all instructions that are extracted from said original peripheral device driver file and calling instruction emulation functions in a virtualized guest system to emulate determined sequence of instructions.

13. The computer system according to claim 10, wherein said instruction code is configured to emulate all APIs that are extracted from said original peripheral device driver file using API Forwarder/Mapper/Emulation functions in a host system.

14. The computer system according to claim 10, wherein said computer system has at least one universal serial bus port (USB port) for use in the input and output of data, and wherein the peripheral hardware device is connected to the computer system by means of the USB port.

15. The computer system according to claim 10, wherein the combination of said second operating system and said second processor is the same as the combination of said first operating system and said first processor.

* * * * *